(12) United States Patent
Nakane et al.

(10) Patent No.: US 7,466,464 B2
(45) Date of Patent: *Dec. 16, 2008

(54) IMAGE FORMING APPARATUS AND IMAGE FORMING METHOD

(75) Inventors: Rintaro Nakane, Yokohama (JP);
Shigeru Fujiwara, Yokohama (JP);
Hideaki Fukaya, Chiba (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 11/812,861

(22) Filed: Jun. 22, 2007

(65) Prior Publication Data
US 2007/0247680 A1 Oct. 25, 2007

Related U.S. Application Data

(63) Continuation of application No. 10/392,302, filed on Mar. 20, 2003, now Pat. No. 7,236,276.

(30) Foreign Application Priority Data
Apr. 2, 2002 (JP) ............................. 2002-100483

(51) Int. Cl.
*G03F 3/08* (2006.01)
(52) U.S. Cl. .................. 358/521; 358/504; 358/519; 358/525; 399/49

(58) Field of Classification Search .............. 358/406, 358/504, 519, 521, 525, 1.9; 382/167; 399/15, 399/48, 49, 60
See application file for complete search history.

(56) References Cited

U.S. PATENT DOCUMENTS

| 5,274,424 | A | 12/1993 | Hattori et al. |
| 5,351,107 | A | 9/1994 | Nakane et al. |
| 2002/0113984 | A1 | 8/2002 | Nakajima et al. |
| 2007/0019258 | A1 | 1/2007 | Hattori |
| 2007/0024928 | A1 | 2/2007 | Ono |

FOREIGN PATENT DOCUMENTS

JP 2001-045295 A 2/2001

*Primary Examiner*—Kimberly A Williams
(74) *Attorney, Agent, or Firm*—Foley & Lardner LLP

(57) ABSTRACT

A gradation pattern is printed, the gradation pattern is corrected with a gamma correction table $T_O$ based on a result in which the printed gradation pattern is read, the corrected gradation pattern is printed on a photosensitive drum or the like, and a measured density of the printed gradation pattern in S4 is stored as a reference value of density $D_R$. Thereafter, without user's operation, at a set automatic timing, the read gradation pattern P is corrected with the gamma correction table $T_O$ and printed on the photosensitive drum or the like, density deviation $\Delta D$ between a measured density D of the printed gradation pattern in S6 and the reference value of density $D_R$ is determined, and the latest gamma correction table T is generated and updated on the basis of the density deviation $\Delta D$. Consequently, high-quality image formation can be automatically performed.

9 Claims, 21 Drawing Sheets

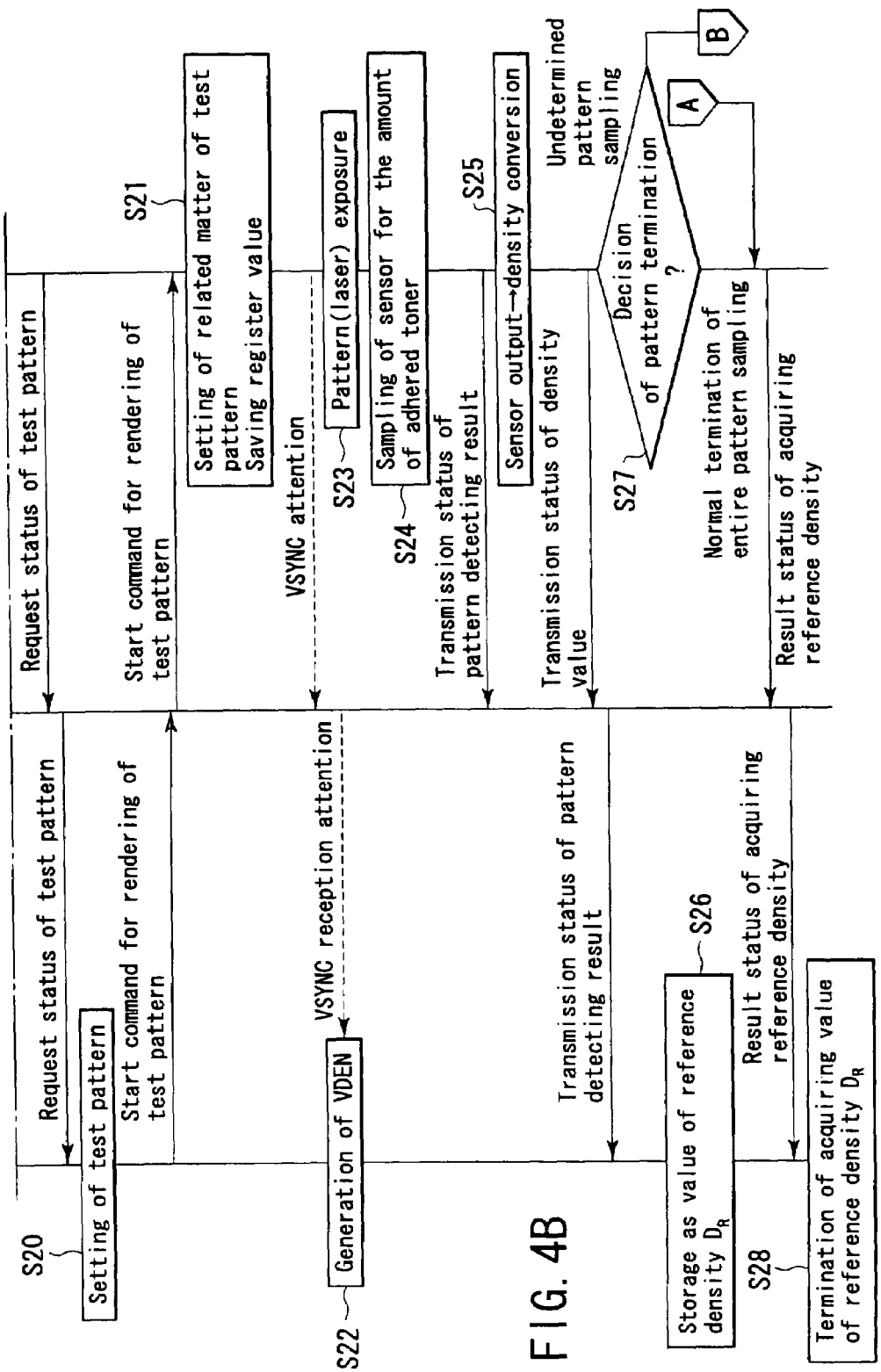

IMAGE FORMING APPARATUS AND IMAGE FORMING METHOD

CROSS-REFERENCE TO RELATED APPLICATIONS

This application is a Continuation of U.S. application Ser. No. 10/392,302, filed Mar. 20, 2003, which claims the benefit of priority from the prior Japanese Patent Application No. 2002-100483, filed Apr. 2, 2002, the entire contents of which are incorporated herein by reference.

BACKGROUND OF THE INVENTION

1. Field of the Invention

The present invention relates to an image forming apparatus, in particular relates to an image forming apparatus and an image forming method, in which a gamma correction table is updated with a simple way.

2. Description of the Related Art

Recently various modes of image forming apparatus are developed, manufactured and widely spread as image information is treated as digital information. In such an image forming apparatus, it is desirable to further increase image quality, a gamma correction table is provided in order to correspond to a change in characteristics of a scanner portion, a printer portion and the like, and the image information is corrected with the gamma correction table to perform the image formation in order to correspond to the change in characteristics.

With reference to the image forming apparatus of the prior art, in generation of the gamma correction table, a gradation pattern stored in a storage area in the apparatus is printed, the printed gradation pattern is read by the scanner, and the gamma correction table is generated and updated on the basis of a result which has been read by the scanner. Accordingly, a result of the desired and high-quality image formation can be obtained with the correction in which physical characteristics of the scanner portion, the printer portion and the like are reflected at that time.

However, operation, in which a printed sheet of the gradation pattern having the built-in gradation pattern printed therein as described above is moved by a user to a scanner table to be read with the scanner, is at least generated in the update processing of the gamma correction table in the apparatus of the prior art. In addition, the operation for changing a normal operation mode to the gamma correction table update mode is also required. Thus, since the update processing of the gamma correction table in the apparatus of the prior art is burdensome for the user, and is not performed periodically and automatically, when the user neglects the update processing of the gamma correction table, there is a problem that it is not always possible to perform the high-quality image formation.

BRIEF SUMMARY OF THE INVENTION

It is an object of the invention to provide an image forming apparatus and an image forming method, in which high-quality image formation applying easily an optimum gamma correction table can be performed by automatically updating the gamma correction table in the image forming apparatus.

In order to achieve the above object, according to an aspect of the present invention, there is provided an image forming apparatus comprising: a pattern forming portion which reads gradation pattern information stored in a predetermined storage area and forms an image according to the gradation pattern information on an image recording medium; a first generating portion which reads the image according to the gradation pattern information on the image recording medium formed by the pattern forming portion by using a scanner, and generates a first gamma correction table on the basis of the read image information; a first printing portion which reads the gradation pattern information stored in the predetermined storage area, corrects the gradation pattern according to the first gamma correction table generated by the first generating portion, and prints an image according to the corrected gradation pattern information on an image carrier; a storage portion which detects a density of the image printed on the image carrier by the first printing portion, with a sensor for the amount of adhered toner, and stores the density of the image as a reference value of density in a storage area; a second printing portion which reads the gradation pattern information stored in the given storage area at an arbitrary timing, corrects the gradation pattern information with the first gamma correction table generated by the first generating portion, and prints an image according to the corrected gradation pattern information on the image carrier; a calculating portion which detects the density of the image printed on the image carrier by the second printing portion, with the sensor for the amount of adhered toner, compares the density of the image to the reference value of density stored in the storage portion, and calculates density deviation; a second generating portion which generates a newly second gamma correction table on the basis of the density deviation which the calculating portion has calculated; and an image forming portion which reads image information on an original with the scanner, corrects the read image information with the gamma correction table formed by the second generating portion, and forms an image based on the corrected image information on the image recording medium.

As described above, the image forming apparatus of the invention decides the gamma correction table by printing and reading once the gradation pattern similarly to the apparatus of the prior art. Then, the gradation pattern is printed on an image carrier such as a drum and density is stored as reference density $D_R$. However, thereafter, the gradation pattern is printed on the image carrier such as the drum and the density D is detected in the same way at a predetermined arbitrary timing, e.g., daily start-up of a copying machine or every three hours in continuous use of the copying machine. The previously recorded reference density $D_R$ is compared to the detected density D to determine density deviation $\Delta D$, and the gamma correction table is automatically updated according to the density deviation $\Delta D$. Consequently, the user can automatically update the optimum gamma correction table at the set timing without performing any special operation.

BRIEF DESCRIPTION OF THE SEVERAL VIEWS OF THE DRAWING

FIGS. 4A and 4B are flow charts illustrating in detail an embodiment of the automatic update processing of the gamma correction table according to the invention;

DETAILED DESCRIPTION OF THE INVENTION

Figure 1:
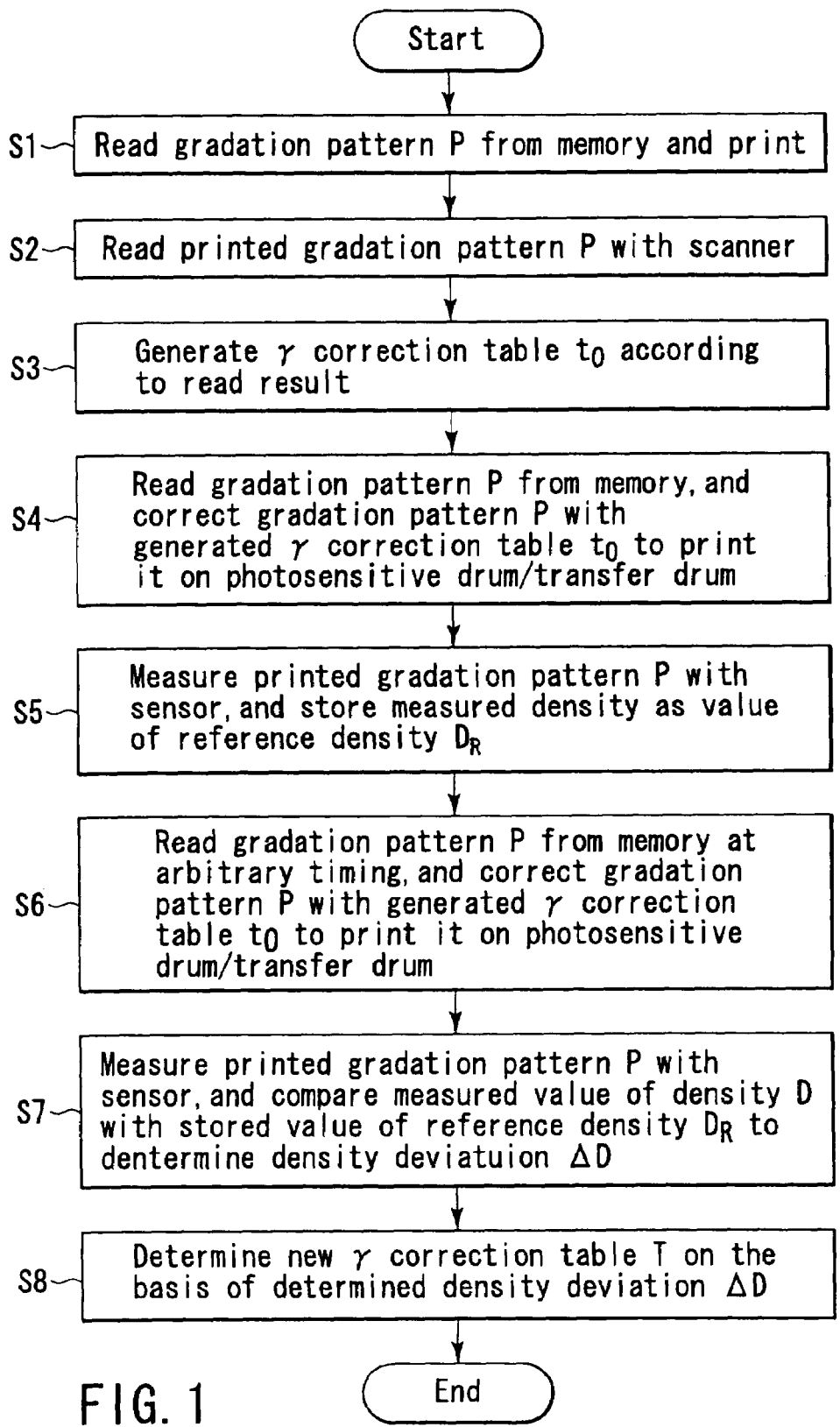
FIG. 1 is a flow chart schematically showing an example of automatic update processing of a gamma correction table according to the invention.

An embodiment of an image forming apparatus according to the invention will be described below referring to the drawings. Though the invention is characterized by the characteristic processing which automatically updates a gamma correction table in the image forming apparatus, at first a structure of the embodiment of the image forming apparatus to which the processing of the invention is applied will be described in detail below by using the drawings.

[Example of Structure of Image Forming Apparatus According to the Invention]

Figure 2:
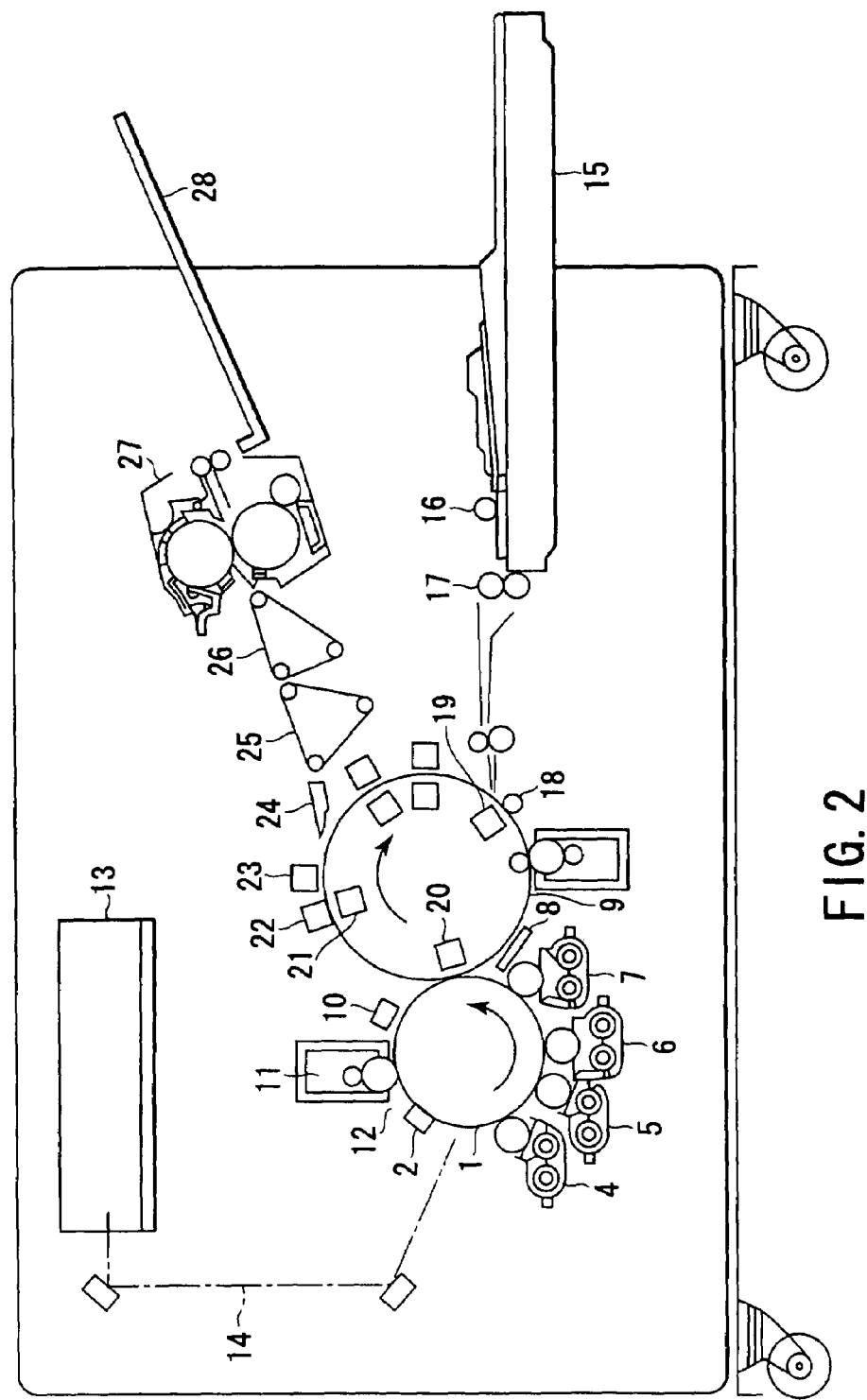
FIG. 2 is a sectional view showing an example of a structure of an image forming apparatus according to the invention.
Figure 3:
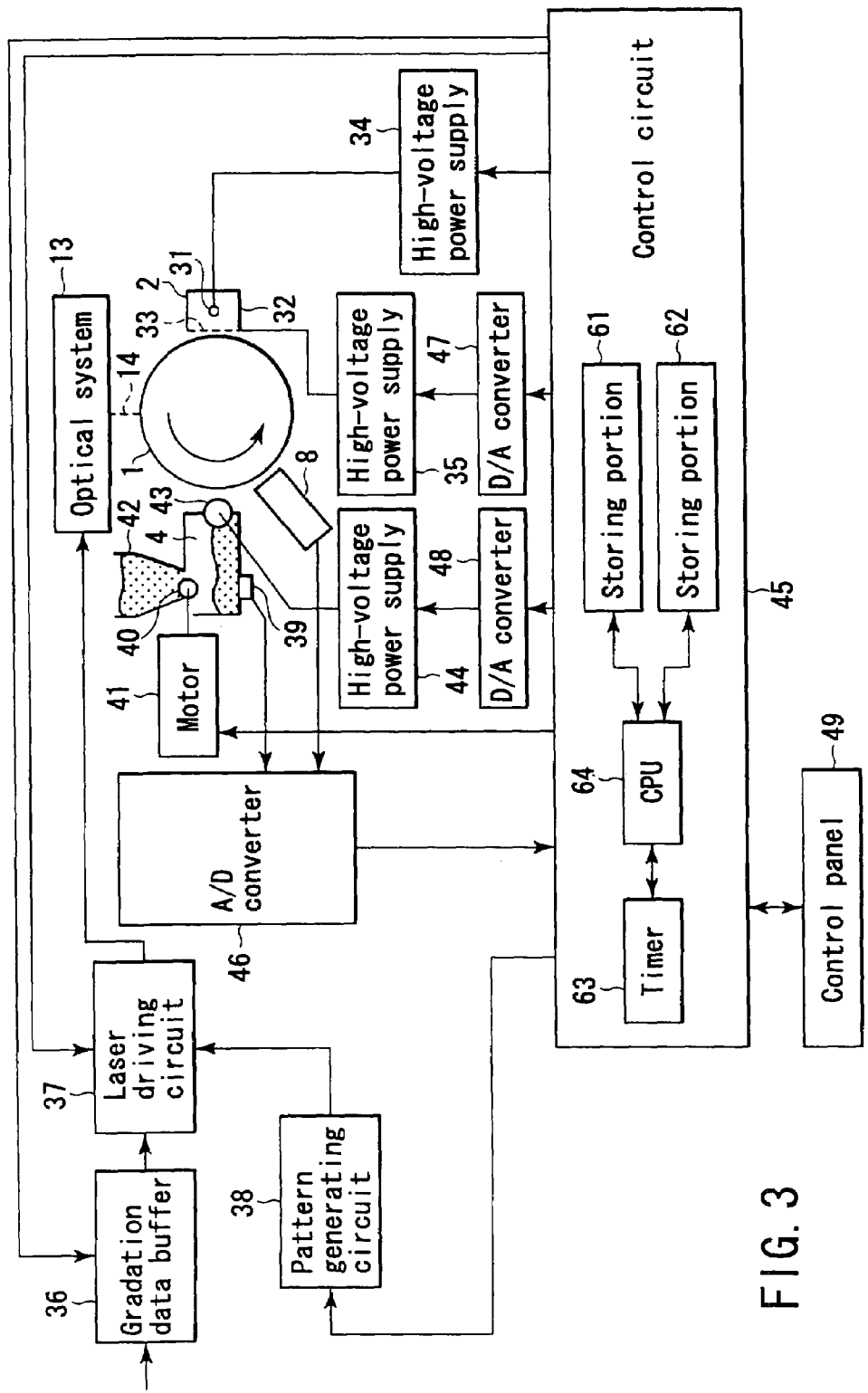
FIG. 3 is a block diagram showing an example of a configuration of the image forming apparatus according to the invention.

FIG. 2 is a sectional view showing an example of the structure of the image forming apparatus according to the invention, and FIG. 3 is a block diagram showing an example of a configuration of the image forming apparatus according to the invention.

As shown in FIG. 2, a color laser printer which is the image forming apparatus is divided mainly into an optical system 13 including a scanner and an image forming portion F. The image forming portion F has a photosensitive drum 1 as an image carrier, and the photosensitive drum 1 is provided so as to be rotatable in a counterclockwise direction to the paper. Further, the image forming portion F includes a charging device 2 which is a charging portion and arranged near the photosensitive drum 1, a first developing device 4, a second developing device 5, a third developing device 6, and a fourth developing device 7, which are a developing portion, a sensor 8 for the amount of adhered toner which detects toner density, a transfer drum 9 which is a transfer material support, a static eliminator 10 before cleaning, a cleaner 11, and an antistatic lamp 12.

The image carrier means a portion bearing the image, and includes not only the photosensitive drum 1 but also the transfer drum 9. In the image of the gradation pattern which is formed in the image carrier during a step of generating a gamma correction table according to the invention, its subject includes the photosensitive drum 1 and the transfer drum 9.

A surface of the photosensitive drum 1 is charged by the charging device 2. A laser beam 14 emitted from a laser exposing device 13 serving as a scanner portion and an exposure portion exposes the surface of the photosensitive drum 1 between the charging device 2 and the first developing device 4, and thereby an electro-static latent image is formed according to image data.

The first to fourth developing devices 4 to 7 develop the electrostatic latent images on the photo-sensitive drum 1 corresponding to each color to a color toner image, for example, the first developing device 4 develops magenta, the second developing device 5 develops cyan, the third developing device 6 develops yellow, and the fourth developing device 7 develops black.

On the other hand, a transfer paper of the transfer material is sent away from a paper feeding cassette 15 by a paper feeding roller 16, adjusted temporarily by a resist roller 17, sent so as to be absorbed at a predetermined position on the transfer drum 9 by the resist roller 17, and electrostaticically adsorbed onto the transfer drum 9 by a adsorbing roller 18 and a adsorption charging device 19. The transfer paper is carried with the clockwise rotation of the transfer drum 9, while the transfer paper is adsorbed on the transfer drum 9.

The developed toner image on the photosensitive drum 1 is transferred on the transfer paper with a transfer charging device 20 at a position where the photosensitive drum 1 opposes to the transfer drum 9. In the case of color print, the process in which one period is one rotation of the transfer drum 9 is performed in plural times while the developing device is changed, and the toner image having the plural colors is multiple-transferred on the transfer paper.

The transfer paper having the toner image transferred thereto is further carried with the rotation of the transfer drum 9, and the static in the transfer paper is eliminated with an inner static eliminator 21 before separation, an outer static eliminator 22 before separation, and a separating static eliminator 23. Then, the transfer paper is peeled from the transfer drum 9 with a separating claw 24 and carried to a fixing device 27 with carrying belts 25 and 26. The toner on the transfer paper, which has been heated with the fixing device 27, is melted and fixed to the transfer paper immediately after the transfer paper is ejected from the fixing device 27. The transfer paper in which the fixing has been completed is ejected to a tray 28.

As shown in FIG. 3, in the above-described color laser printer, the charging device 2 mainly includes a charging wire 31, a conductive case 32, and a grid electrode 33. The charging wire 31 is connected to a high-voltage power supply 34 for corona, and the charging wire 31 charges the surface of the photo-sensitive drum 1 by corona discharge. The grid electrode 33 is connected to a high-voltage power supply 35 for grid bias, and the grid bias voltage controls the amount of charge to the surface of the photosensitive drum 1.

The surface of the photosensitive drum 1, which has been uniformly charged with the charging device 2, is exposed by the modulated laser beam 14 from the laser exposing device 13, and the electrostatic latent image is formed. A gradation data buffer 36 stores gradation data from an external device or a controller, which is not shown, corrects gradation characteristics of the printer, and transforms the gradation characteristics into laser exposing time (pulse width) data.

A laser driving circuit 37 modulates laser-driving current (emission time) according to the laser exposing time data from the gradation data buffer 36 so as to synchronize a scanning position of the laser beam 14. The modulated laser-driving current drives a semiconductor laser oscillator (not shown) in the laser exposing device 13. Accordingly, the semiconductor laser oscillator performs emitting operation according to the exposing time data.

Further, the laser driving circuit 37 compares an output to a set value of a light receiving element for monitoring (not shown) in the laser exposing device 13, and performs control in which the driving current maintains an output light quantity of the semiconductor laser oscillator at a set value.

A pattern generating circuit 38 stores image information of a gradation correcting sheet in order to output the gradation correcting sheet for the automatic update processing of the gamma correction table.

The developing device 4 develops the electrostatic latent image formed on the surface of the photo-sensitive drum 1. That is, the developing device 4 is, for example, a two-component developing method, and stores a developer including the toner and a carrier. A weight ratio of the toner in the developer (hereinafter referred to as toner concentration) is measured by a toner concentration measuring portion 39. A toner supplying motor 41 which drives a toner supplying roller 40 is controlled according to an output of the toner concentration measuring portion 39, the toner in a toner hopper 42 is supplied into the developing device 4.

A developing roller 43 of the developing device 4 is formed by a conductive member and connected to a high-voltage power supply 44 for applying developing bias. The developing roller 43 rotates with the developing bias voltage applied, and performs development in such a manner that the toner adheres to the electrostatic latent image on the photosensitive drum 1. The toner image on the photosensitive drum 1, which has been developed in the above-described manner, is transferred to the transfer paper by the transfer drum 9.

A control circuit 45 causes the gradation data to generate from the pattern generating circuit 38 and exposes the gradation pattern on the photosensitive drum 1, when warm-up processing is terminated after turning on the power.

When the gradation pattern comes to a position where the gradation pattern opposes to the sensor 8 for the amount of adhered toner, the sensor 8 for the amount of adhered toner measures the toner concentration of the gradation pattern.

The output of the sensor 8 for the amount of adhered toner is digitized by an A/D converter 46 and inputted to the control circuit 45.

As described later, the control circuit 45 performs the update processing of the gamma correction table, which uses the gradation pattern.

The high-voltage power supplies 35 and 44 are controlled by an output voltage control signal which is supplied from the control circuit 45 through D/A converters 47 and 48, respectively.

A rewritable storage portion 61 including EEPROM and the like, in which data is not erased even if the power is turned off, a storage portion 62 including RAM and the like for data storage, a timer 63 which measures stand-by time, and a CPU 64 which controls the whole the control circuit 45 are provided in the control circuit 45.

In the storage portion 61, various kinds of set values are previously stored such as initial grid bias voltage value and development bias voltage value which corresponds to bias conditions as reference gradation characteristics at room temperature and room humidity, gradation data of test pattern, a coefficient indicating surface potential characteristics, a predetermined paper count of printing, a predetermined time interval, the maximum number of controls, values of bias conditions, an abnormal range of the sensor 8 for the amount of adhered toner, and quantity of reflected light.

With reference to the values of bias conditions, there are the grid bias, each upper limit value and lower limit value (predetermined range) of development biases, and a permissible range of a voltage difference between the grid bias and the development bias. In a target value of the above-described test pattern portion, the change in an input and display can be performed with a control panel 49.

In the storage portion 62 which has a function of a primary storage portion or a temporarily storage portion, while the bias value which has been set before the sensor 8 for the amount of adhered toner senses the abnormal event is stored (the bias value is stored when a bias changing mode is set), a counter which counts the number of controls, a counter which counts the paper count of printing, a sensor abnormal flag which is flagged when the sensor 8 for the amount of adhered toner senses the abnormal event, and a toner empty flag which is flagged when the toner is empty are provided.

Further, information such as a gamma correction table $T_O$ according to the invention, a gamma correction table T to be updated, and a reference value of density $D_R$, which are described later, is stored in the storage portion 61 as appropriate.

[Automatic Update Processing of Gamma Correction Table According to the Invention]

The automatic update processing of the gamma correction table according to the invention in the above-described color laser printer as the image forming apparatus will be described in detail below by using the flow chart.

(Schematic Description)

FIG. 1 is a flow chart schematically showing an example of the automatic update processing of the gamma correction table according to the invention.

In the flow chart, initialization processing, in which the initial gamma correction table $T_O$ and the reference value of density $D_R$ in the steps S1 to S5 are determined, is performed as a precondition for the automatic update processing of the gamma correction table. Then, the automatic update processing of the gamma correction table is performed at an arbitrary timing on the basis of these values of the initial set processing.

For the first initialization processing, a gradation pattern P is read from the pattern generating circuit 38 and the gradation pattern is printed by the image forming portion F (S1). The sheet of the printed gradation pattern P is set on an original platen (not shown) as a user operation and read with the scanner portion 13 (S2). The gamma correction table $T_O$ is generated according to the read image information (S3). The image information of the gradation pattern P is read from the pattern generating circuit 38 again, and the image is printed on the photosensitive drum 1 (or transfer drum 9) which is the image carrier according to the image information which has been corrected by the gamma correction table $T_O$ generated in the step S3 (S4). The gradation pattern P printed on the image carrier is measured with the sensor 8 for the amount of adhered toner, and the measured density is stored in, e.g., the storage portion 61, setting the measured density to the reference value of density $D_R$ (S5).

Then, for the automatic update processing of the gamma correction table, the gradation pattern P is read from the pattern generating circuit 38 at an arbitrary timing and the image is printed on the image carrier according to the image information which has been corrected with the gamma correction table $T_O$ generated in the step S3 (S6). The printed gradation pattern P is measured with the sensor 8 for the amount of adhered toner, and a density deviation ΔD is determined, comparing the measured value of density D to the stored reference value of density $D_R$ (S7). Finally the new gamma correction table T is determined on the basis of the determined density deviation ΔD (S8). Various kinds of methods of calculating the new gamma correction table T from the density deviation ΔD are thought and it is not limited to one method, however, one of the methods is described later by using the drawings.

The operation, in which the sheet of the gradation pattern stored inside is printed and read in each time, is required in the conventional apparatus, when the gamma correction table T is updated according to environmental change such as temperature change and secular change, however, simplification is achieved as follows in the invention.

That is, similarly to the conventional apparatus, the gamma correction table is determined by printing and reading the gradation pattern once. Then, the gradation pattern is printed on the image carrier such as the drum and the density is stored as the reference density $D_R$. However, thereafter, the gradation pattern is similarly printed on the image carrier such as the drum and the density D is detected at an arbitrary timing set by a user and the like, i.e., at a timing selected by the user such as every morning or every three hours. Comparing the recorded reference density $D_R$ to the detected density D, the density deviation ΔD is calculated, and the gamma correction table is automatically updated according to the density deviation ΔD. Such processing allows the user to automatically update the optimum gamma correction table for present conditions of the devices at an arbitrary timing without performing any special operation.

(Detail Description)

Figure 4A:
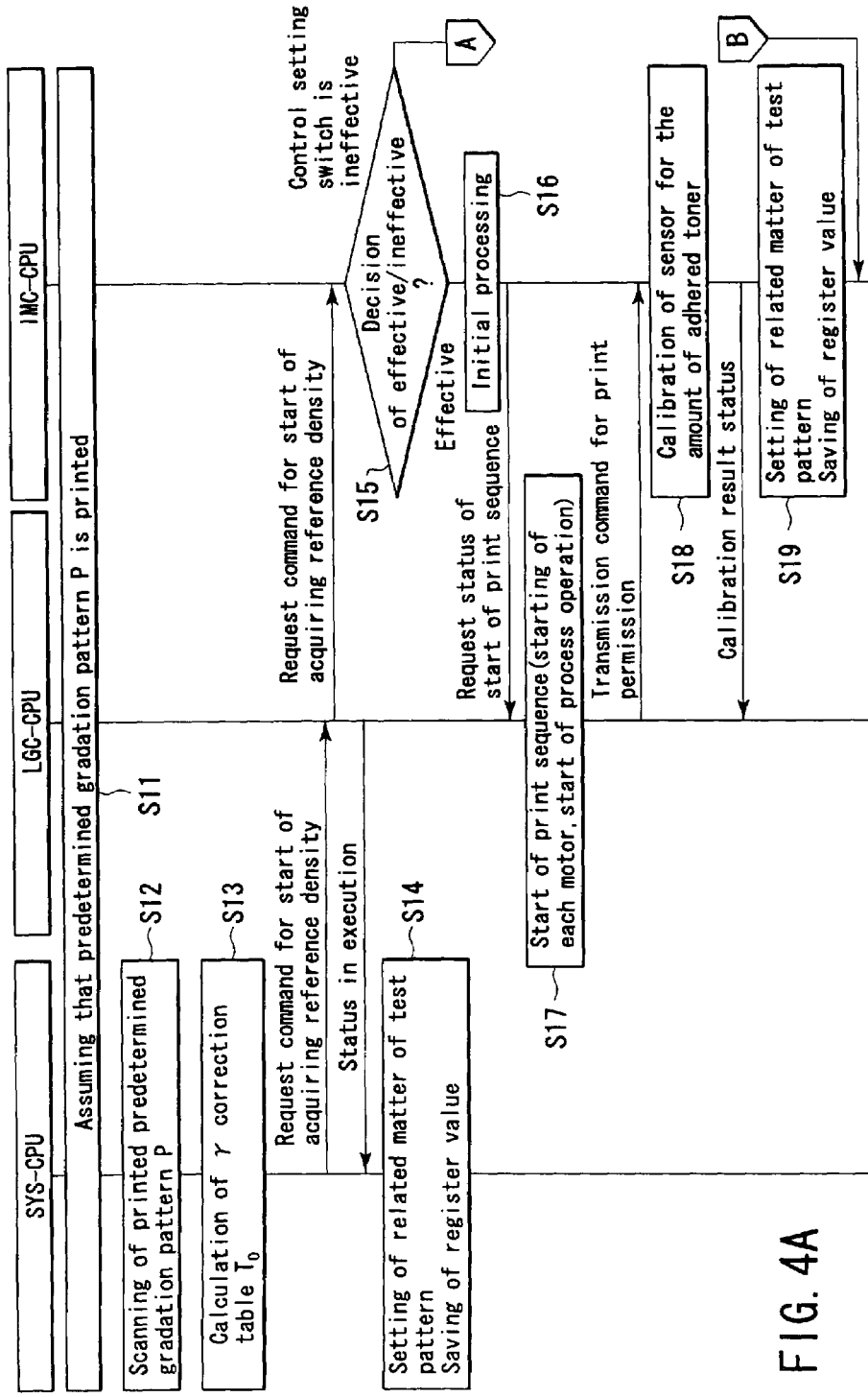
Figure 5A:
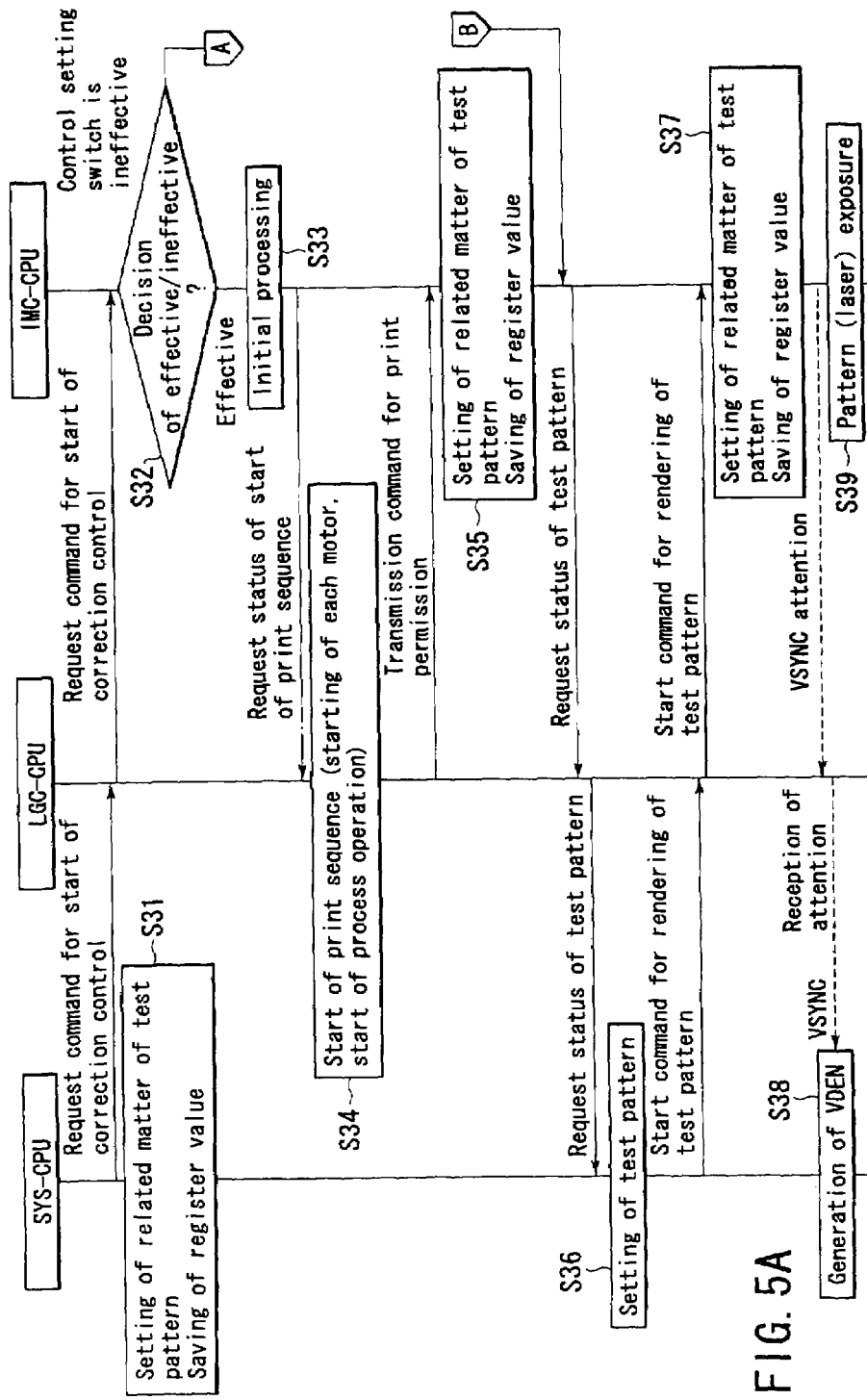
FIGS. 5A and 5B are flow charts illustrating in detail an example of the automatic update processing of the gamma correction table according to the invention.
Figure 5B:
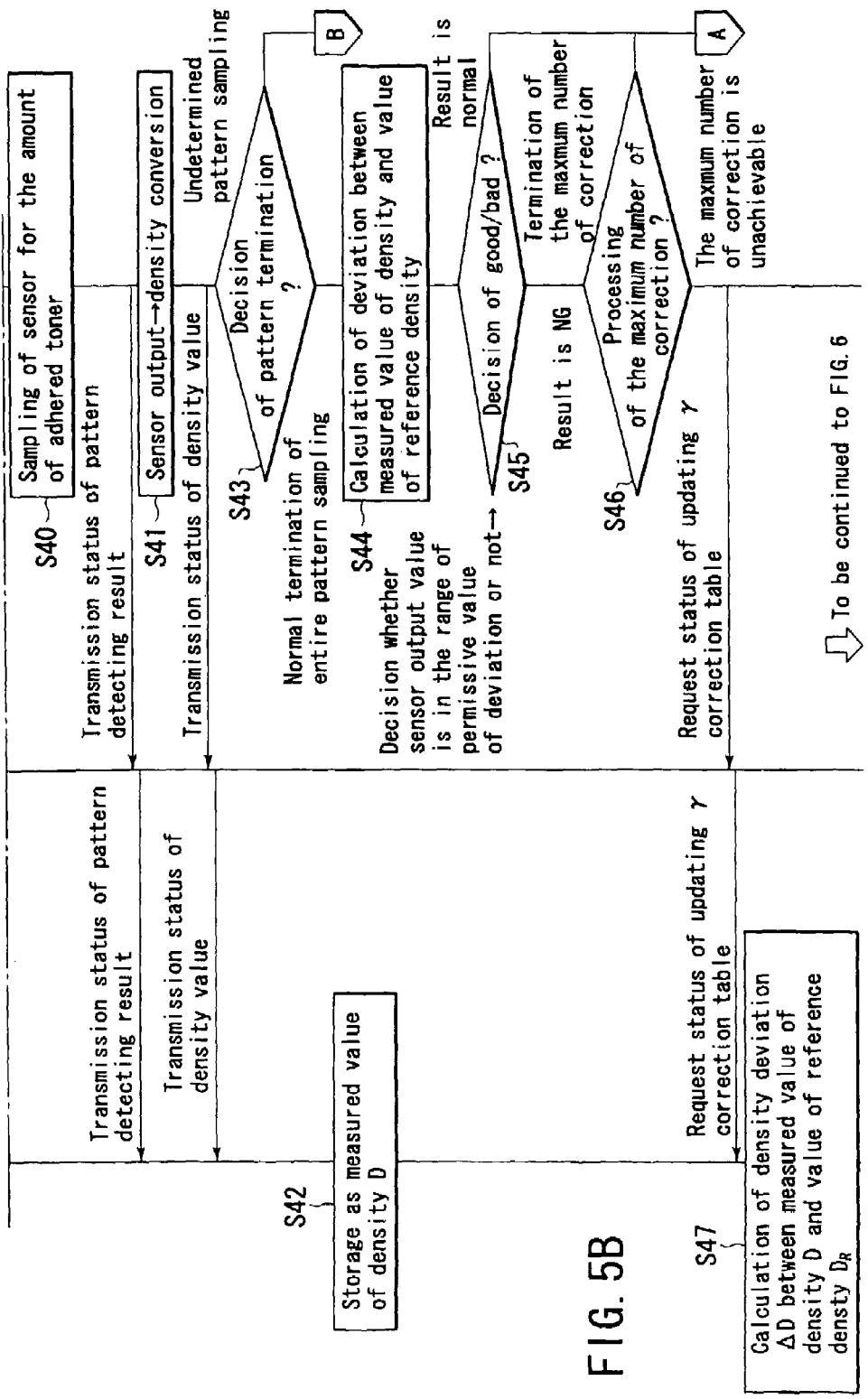
Figure 6:
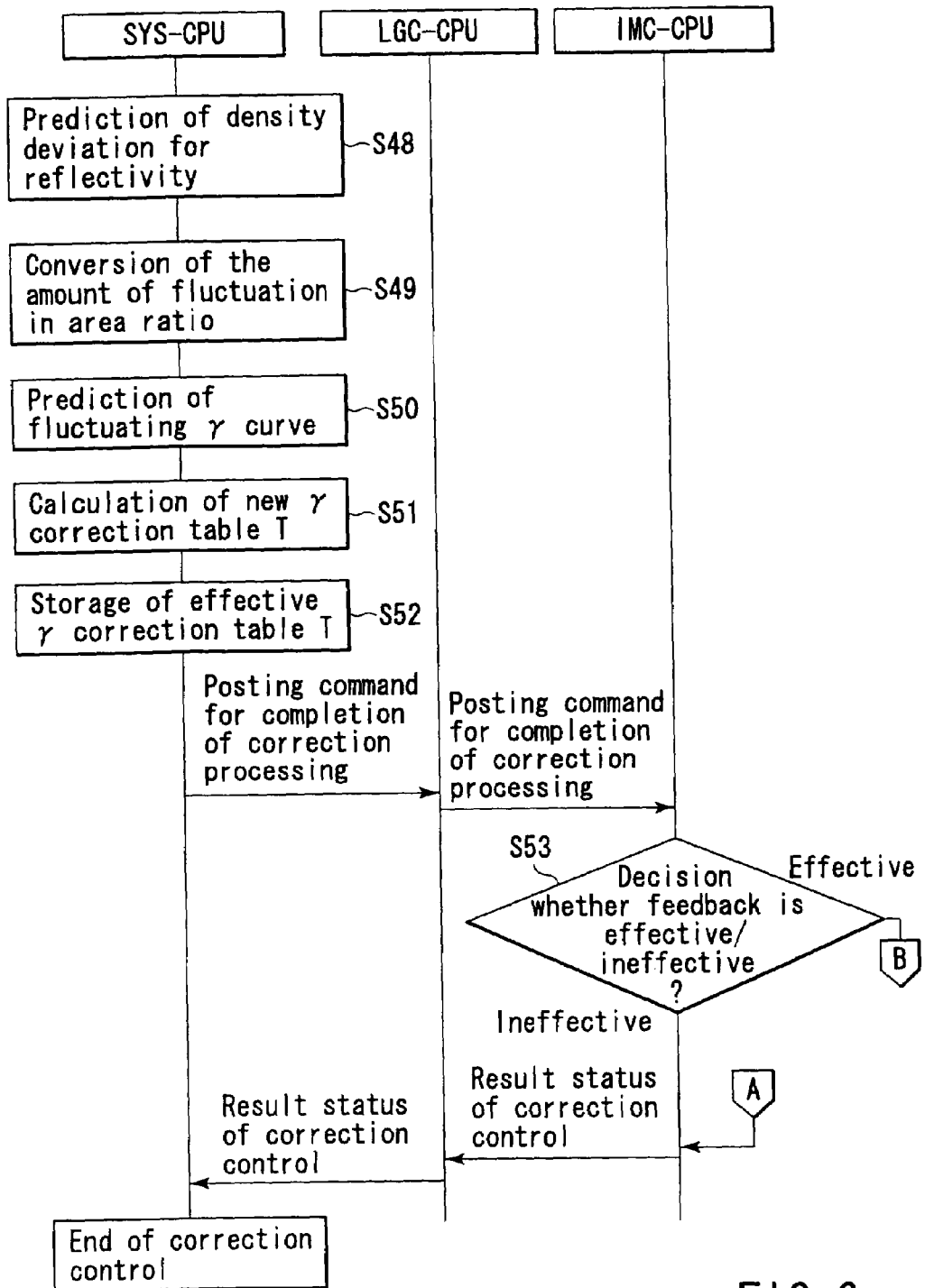
FIG. 6 is a flow chart illustrating in detail an example of the automatic update processing of the gamma correction table according to the invention.

FIGS. 4A, 4B, 5A, 5B and 6 are flow charts illustrating in detail an example of the automatic update processing of the gamma correction table according to the invention. FIGS. 4A and 4B show initialization processing, and FIGS. 5A, 5B and 6 show automatic update processing.

FIGS. 7 to 19 are graphs regarding the automatic update processing of the gamma correction table according to the invention. FIGS. 8 to 14 are graphs illustrating the initialization processing for the automatic update processing, and FIGS. 15 to 19 are graphs illustrating the automatic update processing itself.

1. Initialization Processing

The initialization processing will be described by using the flow chart in FIGS. 4A and 4B.

Figure 7:
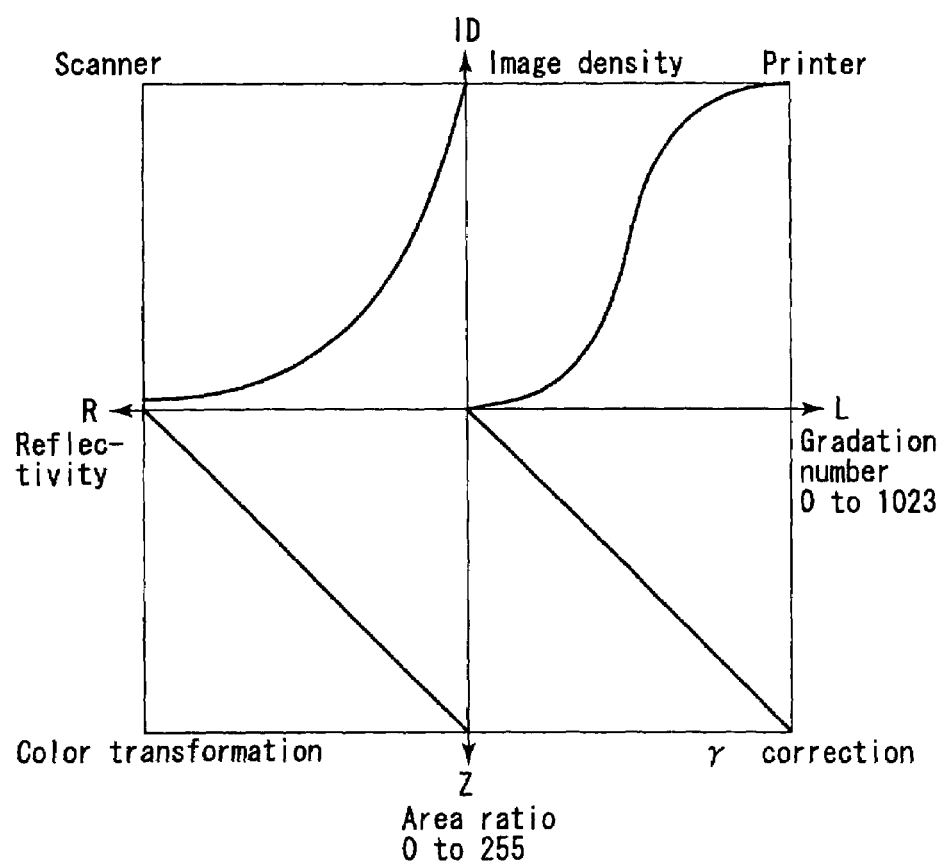
FIG. 7 is a graph for illustrating definition of each axis of the graph illustrating the automatic update processing of the gamma correction table according to the invention.

First the graph illustrating a process of determining the gamma correction table is described. FIG. 7 is the graph for illustrating definition of each axis of the graph illustrating the automatic update processing of the gamma correction table according to the invention. The first quadrant is the graph showing the relation between the gradation number L and image density ID in the printer, the second quadrant is the graph showing the relation between reflectivity R and the image density ID in the scanner, the third quadrant is the graph showing the relation between the reflectivity R and the area ratio Z in color transformation processing, and the fourth quadrant is the graph showing the relation between an area ratio Z and the gradation number L in the gamma correction. The gamma correction table T is obtained by following the relations from the first quadrant to the fourth quadrant.

In the flow charts of FIGS. 4A and 4B, the initialization processing is described in detail as the concrete processing. The processing is performed by control of the CPU 64 shown in FIG. 3, and the processing is classified into three parts according to contents of the processing in the flow charts of FIGS. 4A and 4B, i.e., the processing of SYS-CPU which is the systematic processing, the processing of LGC-CPU which is the mechanical operation processing, and the processing of IMC-CPU which is the image information processing. However, these three parts of the processing may be performed with one CPU or three CPUs and three programs. Accordingly, the CPU 63 may be one CPU or a generic term of the plural CPUs.

The gradation pattern P is read from the pattern generating circuit 38, and a predetermined gradation pattern P is printed (S11). The sheet of the printed gradation pattern P is set on the original platen (not shown) as the user operation and scanned by the scanner portion 13 (S12). Then, the gamma correction table $T_O$ is generated according to the read image information (S13).

Figure 8:
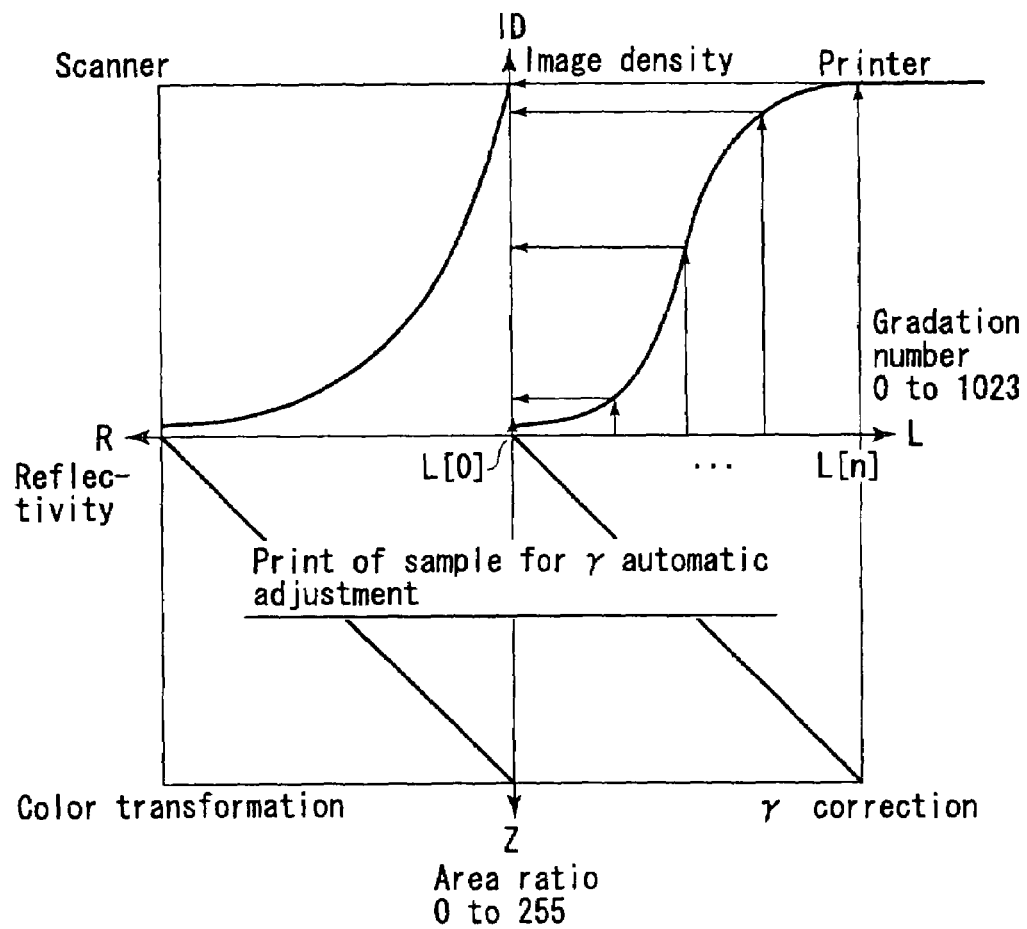
FIG. 8 is a graph showing image density of a sample in which a gradation sheet for gamma correction is printed by a printer regarding the automatic update processing of the gamma correction table according to the invention.
Figure 9:
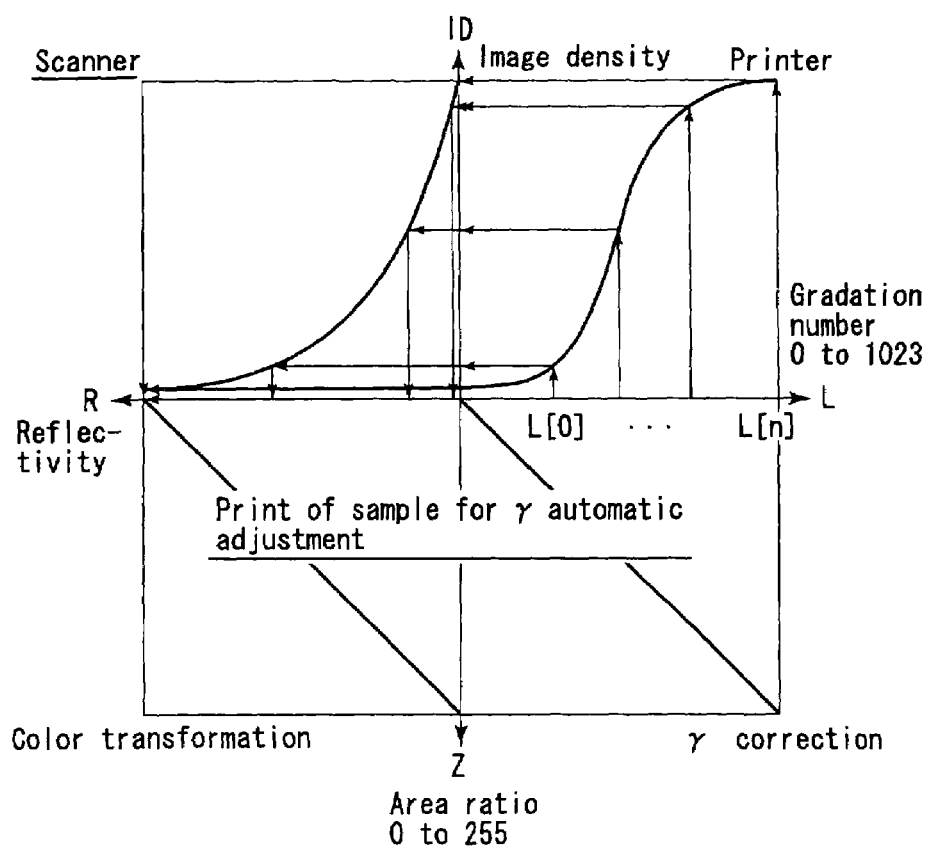
FIG. 9 is a graph showing reflectivity regarding the automatic update processing of the gamma correction table according to the invention when the gradation sheet for gamma correction is read by a scanner.
Figure 10:
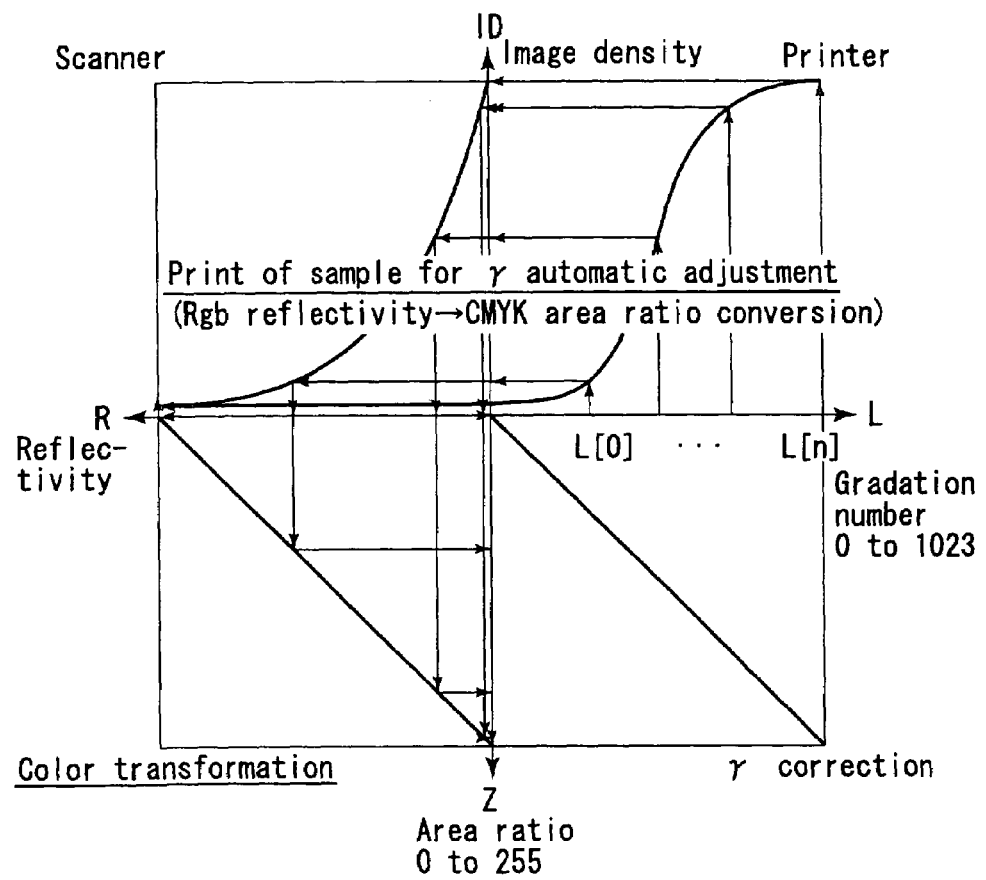
FIG. 10 is a graph showing a case in which the reflectivity is transformed into an area ratio regarding the automatic update processing of the gamma correction table according to the invention.
Figure 11:
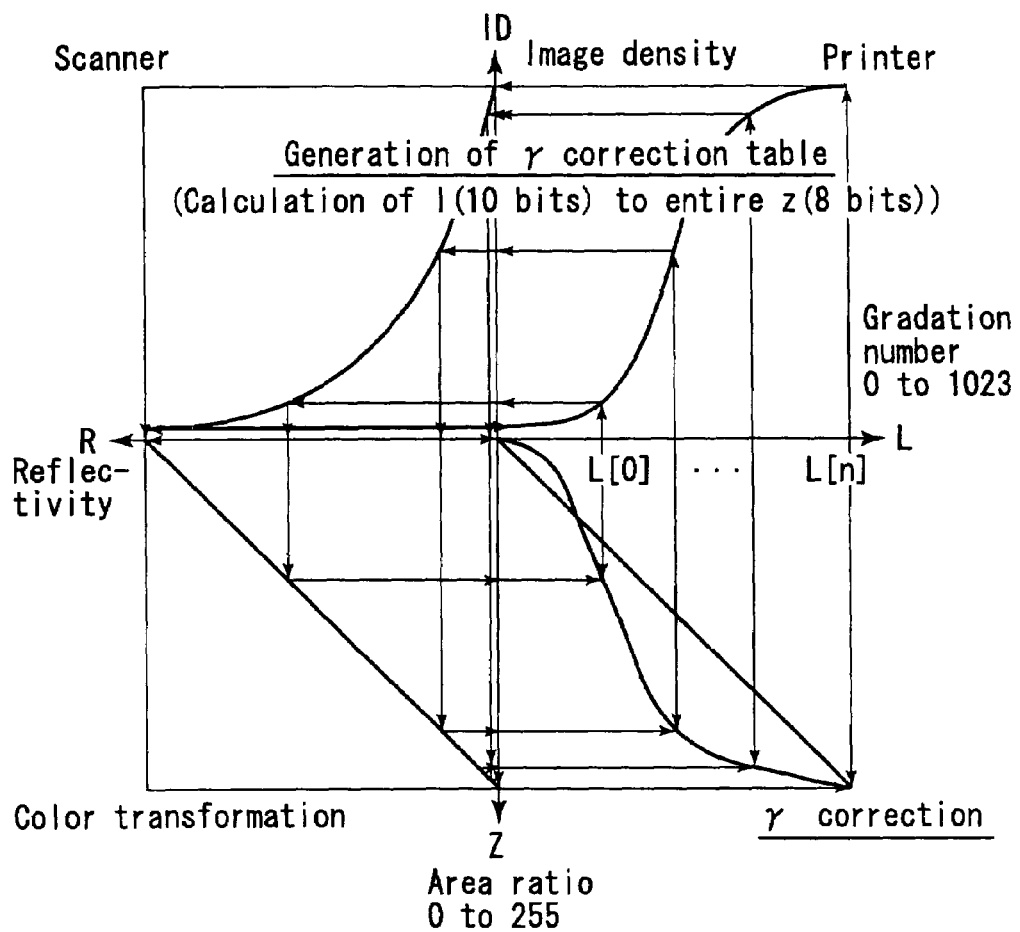
FIG. 11 is a graph showing calculation of a gamma correction curve (a gradation number L to the area ratio Z) regarding the automatic update processing of the gamma correction table according to the invention.
Figure 12:
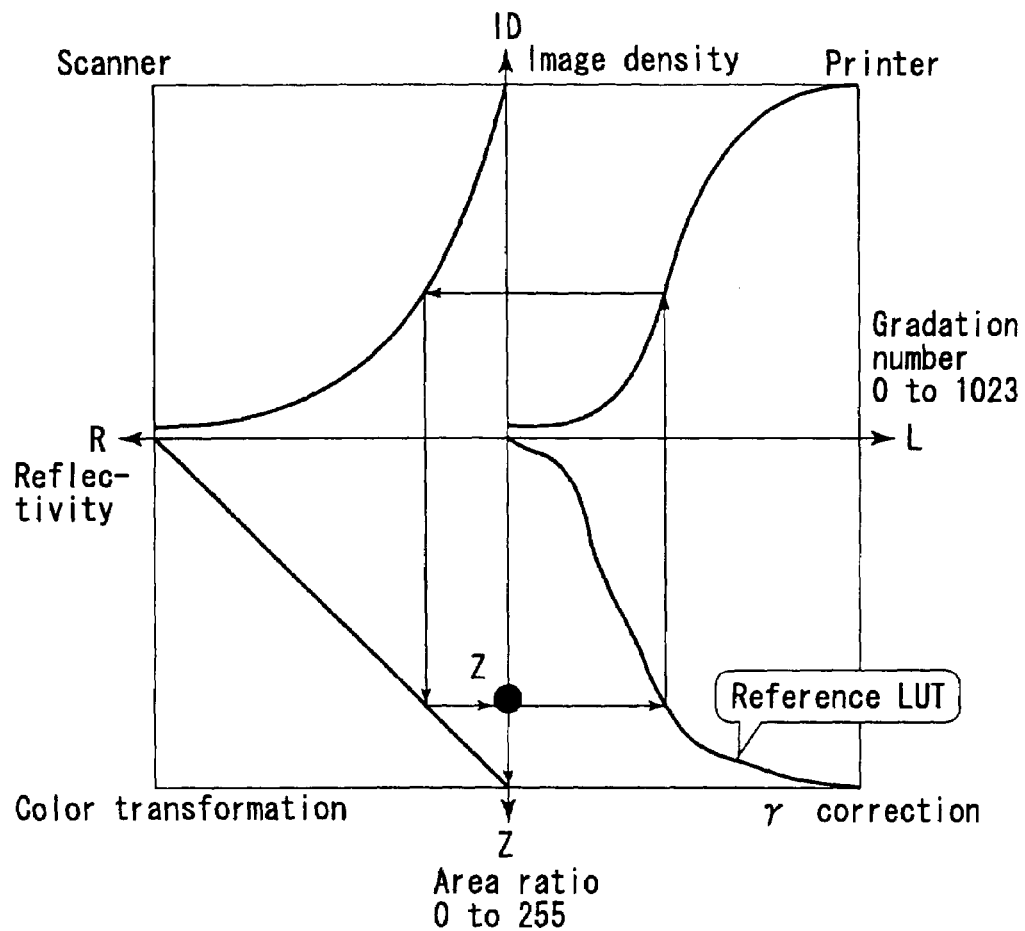
FIG. 12 is a graph showing relationship regarding the automatic update processing of the gamma correction table according to the invention when data of the area ratio Z is gamma-corrected to be transformed into print/scanning/area ratio.

The graphs in FIGS. 8 to 11 illustrate the process until the gamma correction table $T_O$ is calculated. That is, FIG. 8 is the graph showing the image density of a sample in which the gradation sheet for the gamma correction is printed by the printer, FIG. 9 is the graph showing the reflectivity when the gradation sheet for the gamma correction is scanned by the scanner, FIG. 10 is the graph showing the case in which the reflectivity is transformed into the area ratio, FIG. 11 is the graph showing the calculation of the gamma correction curve (the gradation number L to the area ratio Z), and FIG. 12 is the graph showing the relationship when the area ratio Z data is transformed into print/scan/area ratios with the gamma correction. In FIG. 12, a reference look-up table (LUT) of the gamma correction table is generated.

When a request command for start of acquiring reference density is given to the CPU 63 from the state of the step S13, an valid decision whether or not acquiring operation of the sensor reference density is performed is started by receiving the request command. Further, status in execution is outputted from LGC-CPU and the status in execution is received with SYS-CPU, so that operating state of the image forming apparatus can be confirmed by the user, for example, "EXECUTION OF CALIBRATION" can be displayed on the control panel.

A setting-register value of related matter of test pattern is saved according to the valid decision (S14). Then, the decision of the validity or invalidity is performed (S15). The validity or invalidity is formed so as to be changed by a service person or the like, the processing is terminated without executing the acquiring operation of the reference density (or measured density) when the decision is the invalidity.

When the decision is the validity, the initial processing is performed (S16). Then, a request status of start of print sequence is given to LGC-CPU. This status is a trigger starting operation of the image forming process. The status is one which starts rotating operation of a motor or the like for driving the photosensitive drum and the transfer drum, and turns on various kinds of high-voltage power supplies such as the charging/development to allow the apparatus to form the image.

When the request status of start of print sequence is given to LGC-CPU, the print sequence is started (S17). That is, each motor is set in motion and the process operation is started. When a transmission command for print permission, i.e., the command notifying that the apparatus has become the state in which the image can be formed is given to IMC-CPU, the calibration of the sensor 8 for the amount of adhered toner is performed and a calibration result status, i.e., the status transmitting the calibration result of the sensor is outputted to the LGC-CPU (S18).

Next the setting-register value of related matter of test pattern is saved, i.e., various kinds of setting (a start position or finish position of the image, selection of the gradation data, and the like) are performed during the generation of the test pattern, the original setting is saved (stored) such that a common register which is used even in other image forming operation can be returned to the original setting (S19).

According to the saving of the setting-register value of related matter of test pattern, a request status of the test pattern, i.e., the status notifying generating color, a kind, the gradation number, and the like of the test pattern is outputted and the test pattern is set (S20). The various kinds of setting are finished on the basis of a start command for rendering of test pattern, i.e., the notification in the request status of test pattern, and the register value of related matter of test pattern is set when the command notifying that the test pattern can be rendered is outputted (S21).

According to the setting of the register value, VSYNC attention which is a signal for taking start timing to write the image because sampling timing of the test pattern is controlled with a sensor in IMC-CPU, i.e., a synchronizing signal of sub-scanning (VSYNC) is generated. An valid signal of sub-scanning width (VDEN) is outputted by receiving the synchronizing signal of sub-scanning (VSYNC) (S22), the image data of the sub-scanning width of the test pattern is outputted (S23). The sampling of the sensor for the amount of adhered toner is performed (S24).

According to the sampling, a transmission status of pattern detecting result is outputted, i.e., the status notifying the sensor output result in the reading of the test pattern is outputted (S25). According to the sensor output, a transmission status of density value is outputted, i.e., the density value is determined on the basis of the calibration result of the sensor and the sensor output result during the reading of the test pattern, and the status for notifying the density value is outputted. The determined value of the reference density $D_R$ is recorded in the storage portion 61 or the like (S26).

At this point, decision of pattern termination is performed (S27). That is, when the pattern to be generated is across plurality (the pattern is generated by the many gradation numbers), sometimes there is the case in which the rendering is not completed in one cycle. In this case, the sampling operation is performed by dividing the many gradation numbers into some cycles. In the case of the plural cycles, whether or not the sampling of the whole pattern is terminated (all the cycles are terminated) is decided at this decision part.

When the sampling of the whole pattern is normally terminated, a result status of acquiring reference density, i.e., the status notifying that the sampling of the whole test pattern is normally terminated in the acquisition of the reference density is outputted, and the acquisition of the reference value of density $D_R$ is terminated (S28).

Figure 13:
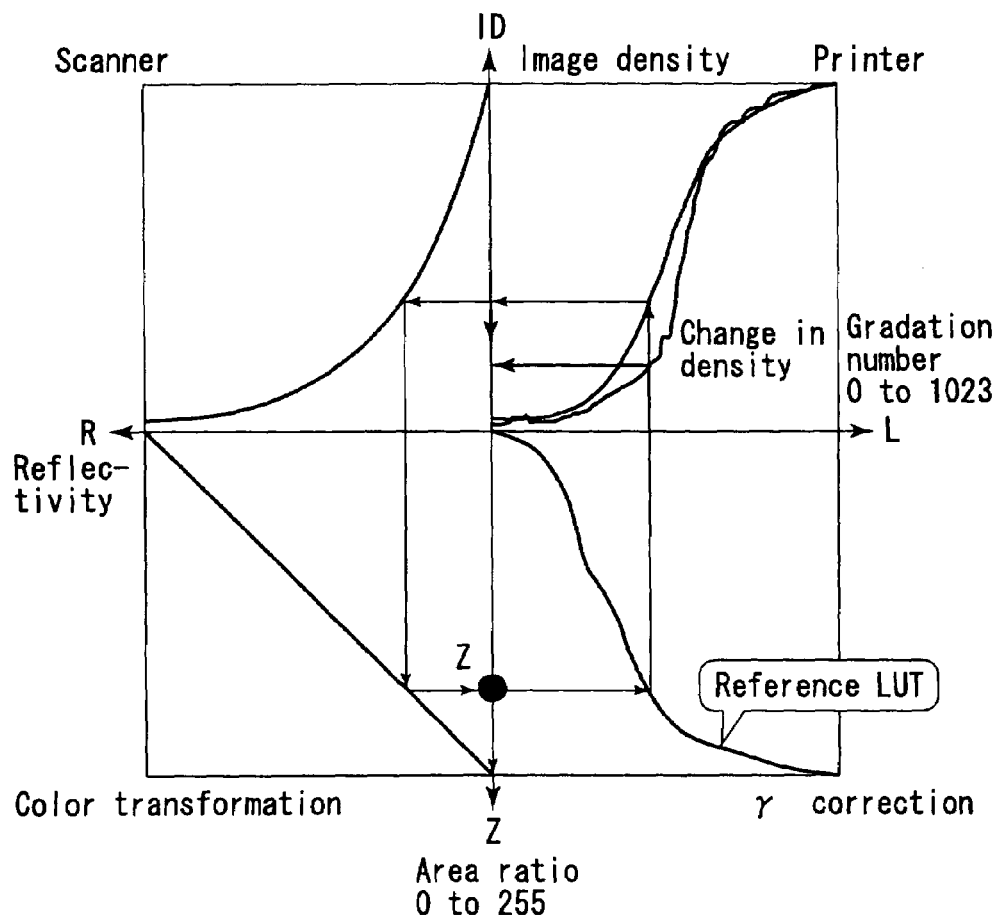
FIG. 13 is a graph showing an example of fluctuation in printer gradation characteristics regarding the automatic update processing of the gamma correction table according to the invention.
Figure 14:
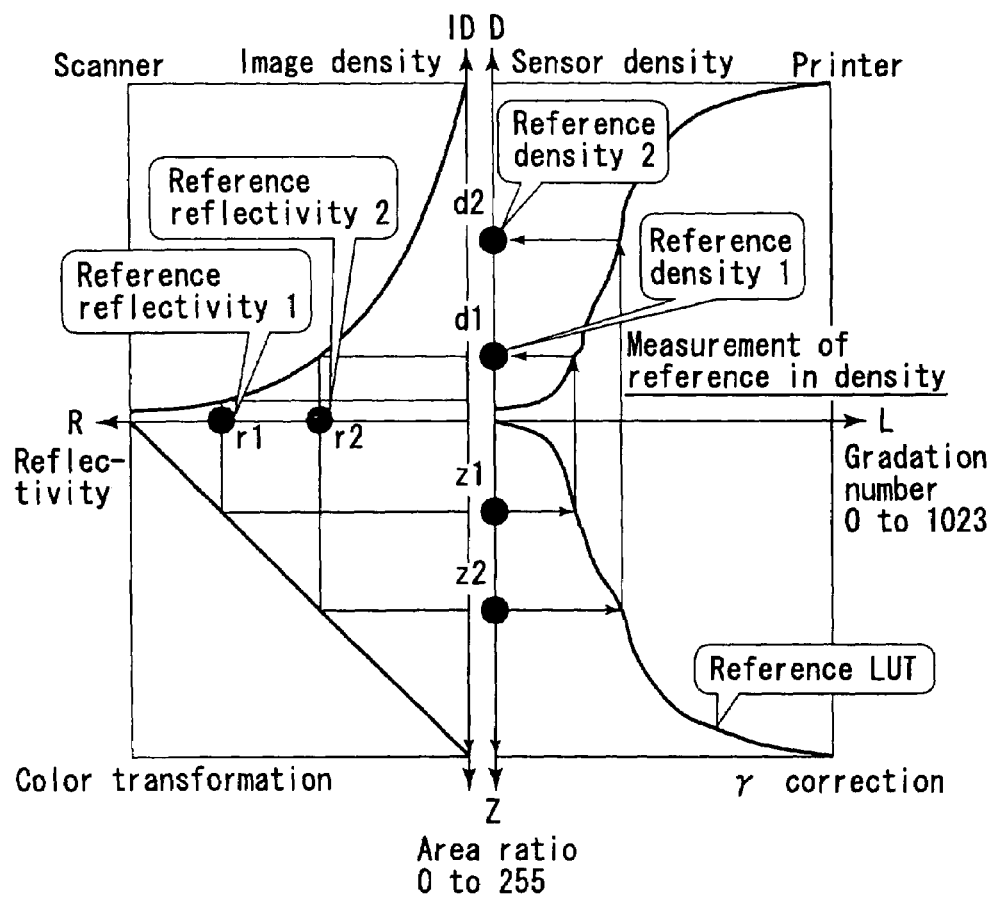
FIG. 14 is a graph showing reference densities d1 and d2 measured by a sensor regarding the automatic update processing of the gamma correction table according to the invention.

FIG. 13 is the graph showing an example of the deviation of printer gradation characteristics, and FIG. 14 is the graph showing measurement of the reference densities d1 and d2 by the sensor. FIGS. 13 and 14 illustrate the process in which the reference value of density $D_R$ is determined on the basis of the reference look-up table generated in the step S13.

Thus, the gamma correction table $T_O$ as an initial value and the reference value of density $D_R$ are determined by the above-described initialization processing.

2. Automatic Update Processing

The automatic update processing will be described below by the flow charts in FIGS. 5A, 5B and 6. The automatic update processing is one in which the measured value of density D of the gradation pattern formed on the image carrier is detected at the arbitrary timing and compared to the reference value of density $D_R$ measured in the initialization processing to determine the density deviation ΔD and the latest gamma correction table T is generated on the basis of the density deviation ΔD.

Figure 15:
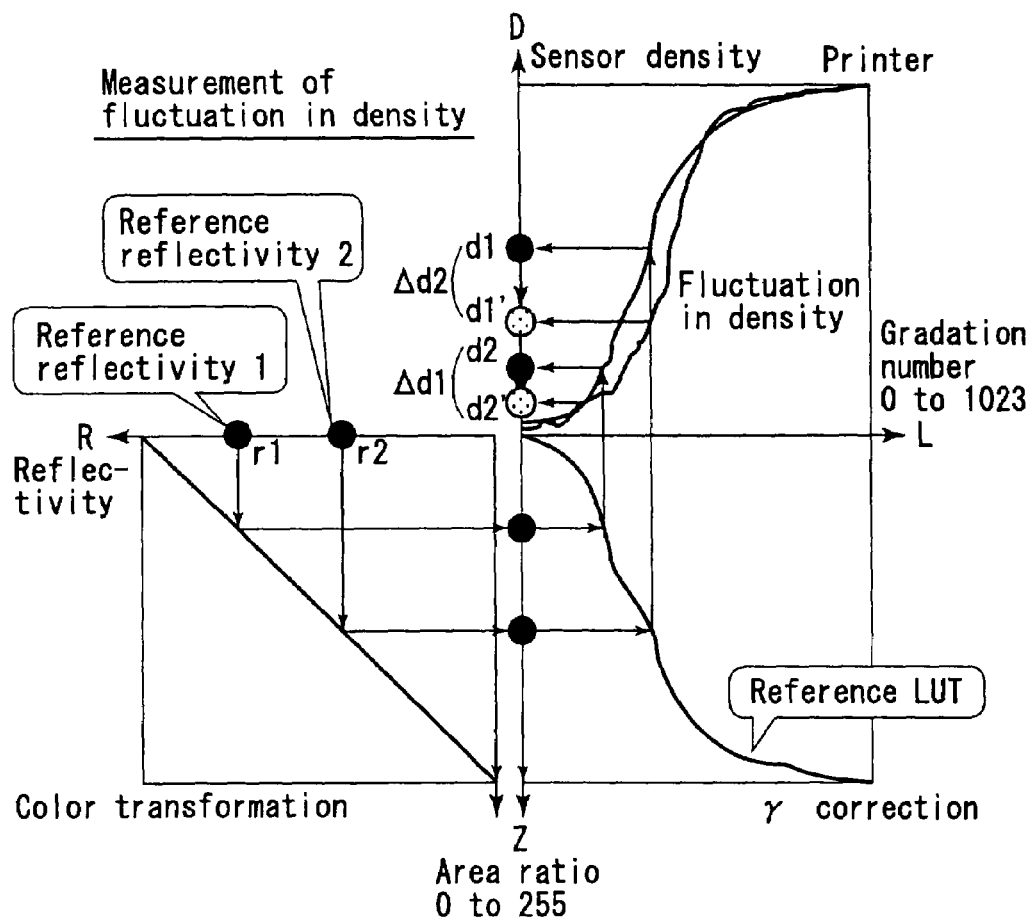
FIG. 15 is a graph showing sensor densities d1' and d2' during the fluctuation in the density regarding the automatic update processing of the gamma correction table according to the invention.
Figure 16:
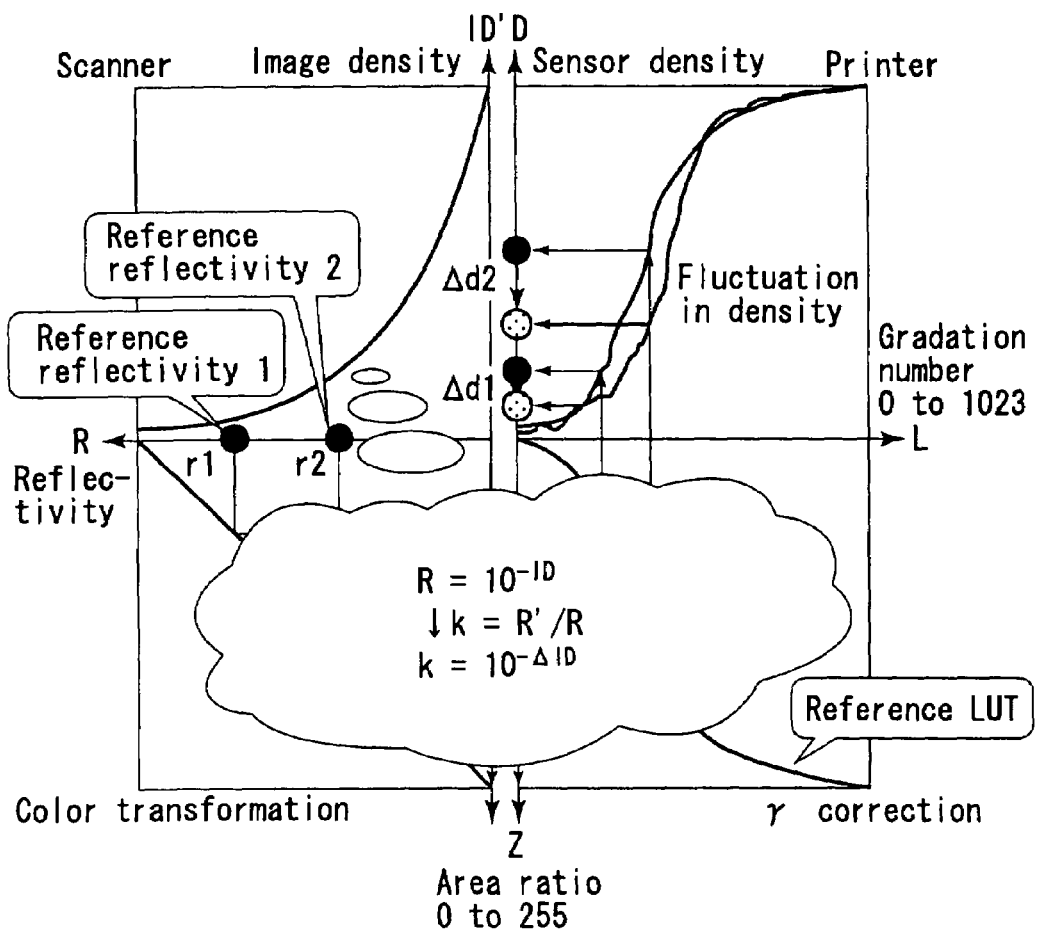
FIG. 16 is a graph showing relationship between density deviation and the reflectivity regarding the automatic update processing of the gamma correction table according to the invention.
Figure 17:
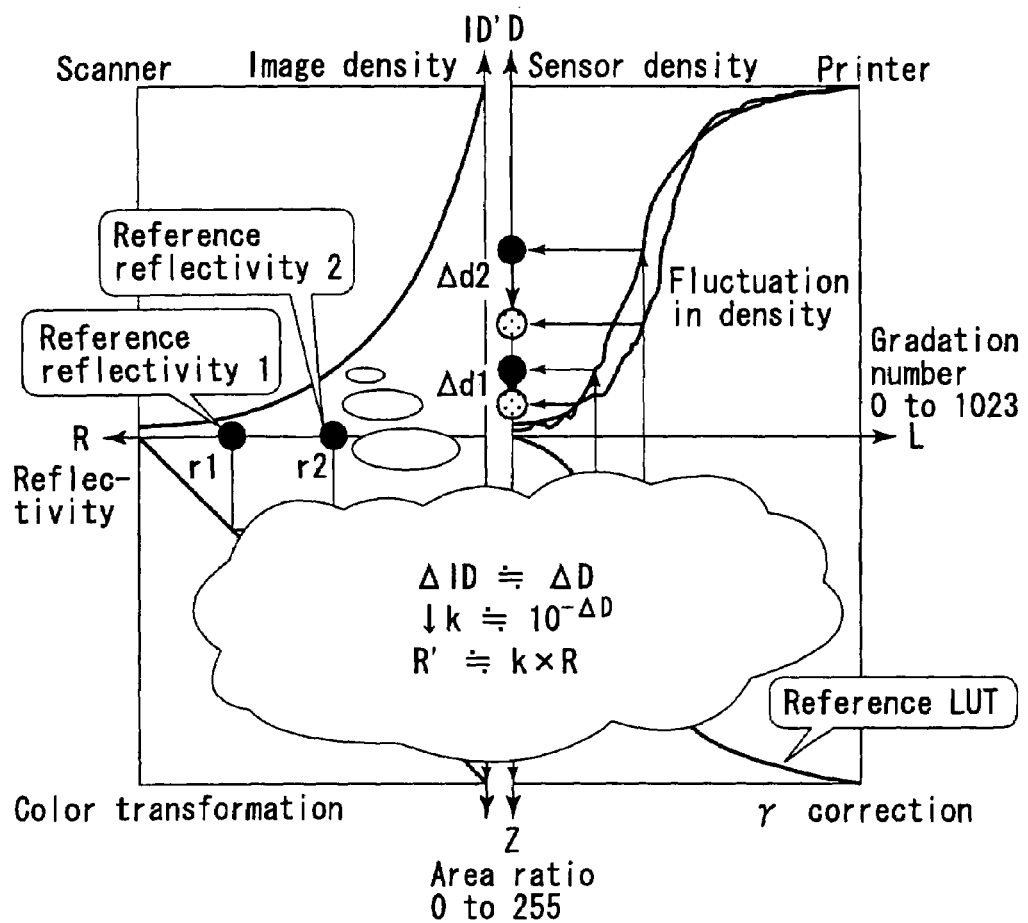
FIG. 17 is a graph showing approximation calculated by the sensor density deviation regarding the automatic update processing of the gamma correction table according to the invention.
Figure 18:
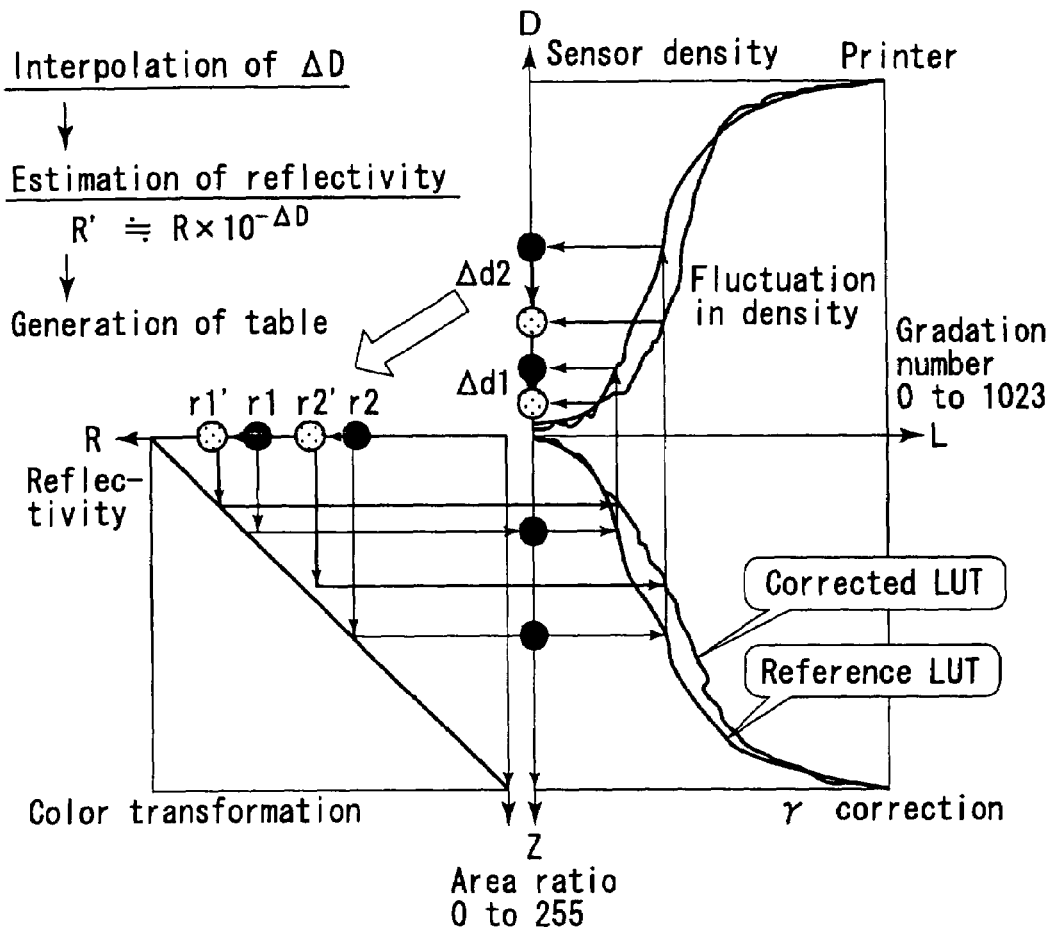
FIG. 18 is a graph showing a process of generating correction LUT from the sensor density deviation ΔD regarding the automatic update processing of the gamma correction table according to the invention.
Figure 19:
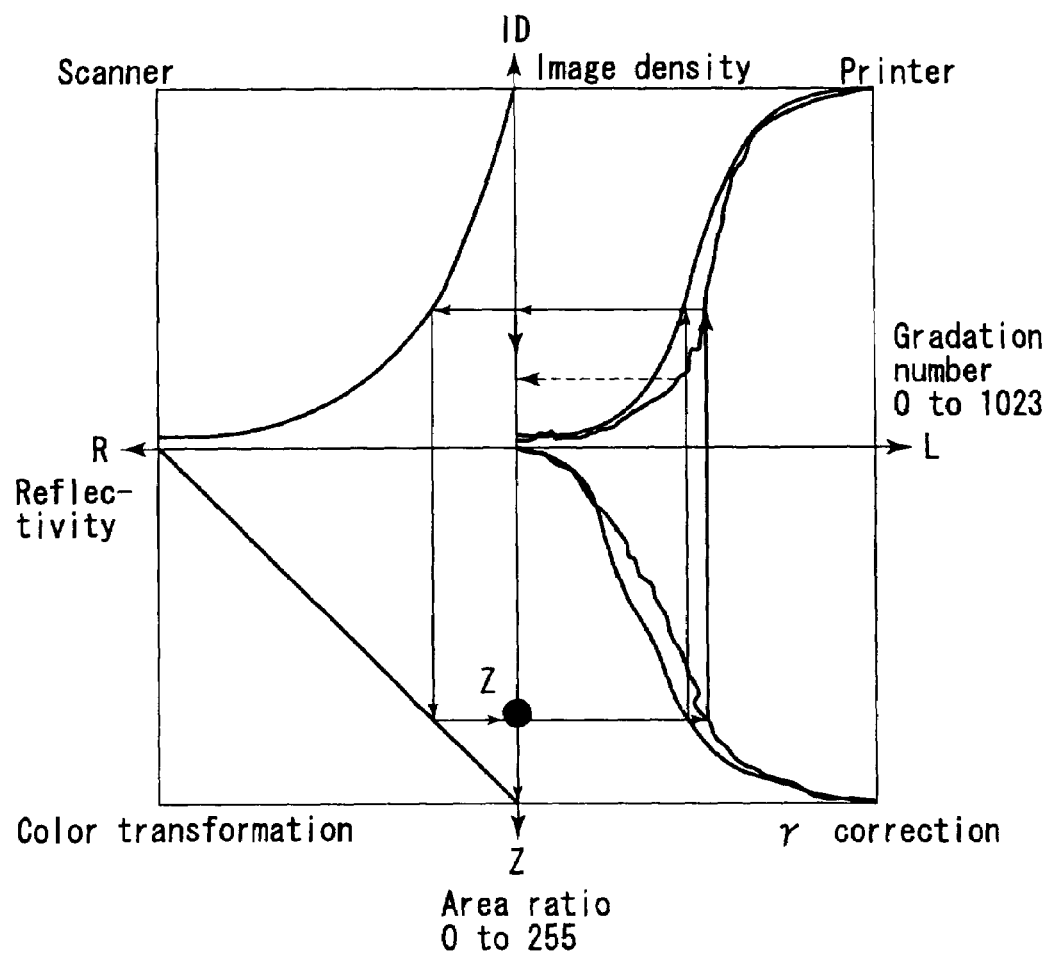
FIG. 19 is a graph showing an image density after correction regarding the automatic update processing of the gamma correction table according to the invention.

FIG. 15 is the graph showing the sensor densities d1' and d2' during the deviation in the density, FIG. 16 is the graph showing the relationship between the density deviation and the reflectivity, FIG. 17 is the graph showing approximation calculated by the sensor density deviation, FIG. 18 is the graph showing the process of generating the correction LUT from the sensor density deviation ΔD, and FIG. 19 is the graph showing the image density after the correction.

In the flow charts of FIGS. 5A and 5B, when a request command for start of correction control is received, the setting-register value of related matter of test pattern is saved (S31). The user can freely set the timing when the request command for start of correction control is submitted, or the timing is appropriately factory-adjusted. For example, when the apparatus is started in motion, the automatic update of the gamma correction table may be performed one a day or once every several hours, or the automatic update may be commanded from the control panel 49. Further, the setting of a date and time and the setup of the automatic update of the gamma correction table may be performed by communication.

The decision of validity or invalidity is performed according to the request command for start of correction control (S32). The validity or invalidity is formed so as to be changed by the service person or the like. When the decision is the invalidity, the processing is terminated without executing the acquiring operation of the measured value of density.

When the decision is the validity, the initial processing is performed (S33). Sequentially, the request status of start of print sequence is given. This status is a trigger starting the operation of the image forming process. The status is one which starts the rotating operation of the motor or the like for driving the photosensitive drum and the transfer drum, and turns on various kinds of high-voltage power supplies such as the charging/development to allow the apparatus to form the image.

When the request status of start of print sequence is given to LGC-CPU, the print sequence is started (S34). That is, each motor is set in motion and the process operation is started.

Next, the register setting value of related matter of test pattern is saved, i.e., various kinds of setting (the start position or finish position of the image, selection of the gradation data, and the like) are performed during the generation of the test pattern, and the original setting is saved (stored) so that the common register which is used even in other image forming operation can be returned to the original setting (S35).

According to the saving of the setting-register value of related matter of test pattern, the request status of test pattern, i.e., the status notifying generating color, a kind, the gradation number, and the like of the test pattern is outputted and the test pattern is set (S36). The various kinds of setting are finished on the basis of the start command for rendering of test pattern, i.e., the notification in the request status of test pattern, and the register value of related matter of test pattern is set when the command notifying that the test pattern can be rendered is outputted (S37).

According to the setting of the register value, VSYNC attention which is the signal for taking the start timing to write the image because the sampling timing of the test pattern is controlled with the sensor in IMC-CPU, i.e., the synchronizing signal of the sub-scanning (VSYNC) is generated. The valid signal of the sub-scanning width (VDEN) is outputted by receiving the synchronizing signal of the sub-scanning (VSYNC) (S38), the image data of the sub-scanning width of the test pattern is outputted (S39). The sampling of the sensor for the amount of adhered toner is performed (S40).

According to the sampling, the transmission status of pattern detecting result is outputted, i.e., the status notifying the sensor output result in the reading of the test pattern is outputted (S41). According to the sensor output, the transmission status of density value is outputted, i.e., the density value is determined on the basis of the calibration result of the sensor and the sensor output result during the reading of the test pattern, and the status for notifying the density value is outputted. The determined value of the density D is recorded in the storage portion 61 or the like (S42).

At this point, decision of pattern termination is performed (S43). That is, when the pattern to be generated is across plurality (the pattern is generated by the many gradation numbers), sometimes there is the case in which the rendering is not completed in one cycle. In this case, the sampling operation is performed by dividing the many gradation numbers into some cycles. In the case of the plural cycles, whether or not the sampling of the whole pattern is terminated (all the cycles are terminated) is decided at this decision part.

Then, comparing the measured value of density D which is measured in the step S42 to the reference value of density $D_R$ which is measured in the step S26, the density deviation ΔD is determined (S44). The decision of approval/disapproval is performed, i.e., the deviation between the measured value of density D and the reference value of density $D_R$ is calculated, and whether or not the deviation ΔD is within the predetermined permissive range is decided. When the deviation ΔD is within the predetermined permissive range, assuming that the result is normal, the gamma correction table is not changed and the new table is not generated (S45).

When the deviation ΔD is out of the predetermined permissive range, the gamma correction table is changed and processing of the maximum number of correction is performed (S46). That is, the maximum number of correction is an upper limit number by which the gamma correction table can be newly generated. When the processing has reached the maximum number of correction, even if the result of the decision of approval/disapproval is disapproval, the processing is terminated without generating the new gamma correction table.

When the processing has not reached the maximum number of correction, the gamma correction table is updated and the request status of updating gamma correction table is outputted, i.e., the status which requires the update of the gamma correction table is outputted when the new gamma correction table is generated by the decision of approval/disapproval and the processing of the maximum number of correction. This status causes the density deviation ΔD to be determined by comparing the measured value of density D to the reference value of density $D_R$, and a kind, object color, and the like of the newly generating gamma correction table is notified (S47).

Then, the density deviation ΔD for the reflectivity R is predicted (S48). A ratio of reflectivity deviation k is determined as $k[L]=10^{-\Delta D}$ from the density deviation ΔD, estimation of deviation reflectivity R' is determined as R'=kR on the basis of the ratio of reflectivity deviation k, and the amount of the deviation of the area ratio Z is converted (S49). A fluctuating gamma curve is predicted according to the conversion (S50). The new gamma correction table T is calculated according to the prediction of the fluctuating gamma curve (S51). Finally, the new gamma correction table T is stored as executing data in the storage portion 61 or the like.

After the storage is completed, a posting command for completion of correction processing is outputted, i.e., the status notifying that the gamma correction table is newly generated on the basis of the deviation between the sensor reference value and the measured value and its storage is terminated is outputted.

According to the posting command, the decision whether or not feedback is valid or invalid is performed, i.e., the decision whether the test pattern is generated again by the newly generated valid gamma correction table to perform feedback control is performed by a feedback deciding flag (S53).

In the case that the feedback deciding flag is invalid, even if the gamma correction table is newly generated, the generation of the test pattern and the sampling of the sensor output are not performed with the valid gamma correction table (it becomes open loop control). Then, a result status of correction control, which shows the normal termination of the correction control, is transmitted.

By using the process described above in detail, the gamma correction table is automatically updated to the optimal value at the arbitrary timing, unlike the user prints the gradation pattern and makes the scanner read the printed gradation pattern in the prior art. Consequently, even if the scanner and printer portion are changed by the temperature change and the secular change, it is possible to provide the image forming apparatus, in which the user can automatically perform the high-quality image formation according to the change in characteristics of the apparatus without re-setting the gamma correction table.

However, those skilled in the art can realized the invention by the various kinds of embodiments described above, it is easy for those skilled in the art to further conceive various kinds of variations of the embodiments, and it is possible without inventive ability to apply the invention to various modes. Accordingly, the invention extends the wide range which is not contradictory to a disclosed principle and a new feature, and it is not limited to the above-described embodiment.

As described above, according to the invention, the reference value of density $D_R$ is compared to the measured value of density D to determine the density deviation ΔD, and the gamma correction table is automatically updated according to the density deviation ΔD at the predetermined arbitrary timing, e.g., the daily start-up of the copying machine or every three hours in continuous use of the copying machine. Consequently, since the user can automatically update the optimum gamma correction table at the predetermined timing without performing any special operation, it is possible to provide the image forming apparatus in which the high-quality image can be automatically formed.

What is claimed is:

1. An image forming apparatus for adhering a toner to a photosensitive member to form a toner image, and transferring the toner image on the photosensitive member onto a transfer member supported by a transfer member supporting member which is included in a transfer apparatus and is provided in contact with the photosensitive member, said image forming apparatus comprising:

a first storing portion which stores gradation pattern information in advance;

a first pattern forming portion which reads the gradation pattern information from the first storing portion, forms a toner image according to the read gradation pattern information on the photosensitive member, and transfers the toner image onto the transfer member by the transfer apparatus;

a first generating portion which reads an image according to the gradation pattern information on the transfer member formed by the pattern forming portion and generates a first gamma correction table on the basis of the read image information;

a second pattern forming portion which reads the gradation pattern information, corrects the gradation pattern information according to the first gamma correction table generated by the first generating portion, forms a toner image corresponding to the corrected gradation pattern information, and transfers the toner image onto the transfer member supporting member;

a second storing portion which detects density of the toner image transferred onto the transfer member supporting member by the first pattern forming portion and storing the detected density as a reference value of density;

a third pattern forming portion which reads the gradation pattern information at an arbitrary timing, corrects the gradation pattern information by the first gamma correction table which the first generating portion generated, forms a toner image according to the corrected gradation pattern information, and transfers the toner image onto the transfer member supporting member;

a calculating portion which detects density of the toner image transferred onto the transfer member supporting member by the third pattern forming portion, and compares the detected density with the reference value of density stored in the first storing portion to determine a density deviation;

a second generating portion which generates a second gamma correction table on the basis of the density deviation which the calculating portion has calculated; and an image forming portion which reads an original image using the scanner, corrects the read image information with the second gamma correction table formed by the second generating portion, forms a toner image based on the corrected image information on the photosensitive member, and transfers the toner image onto the transfer member by the transfer apparatus.

2. An image forming apparatus according to claim 1, wherein the second generating portion performs interpolation processing according to a plurality of gradation numbers for the density deviation determined by the calculating portion, determines a ratio of reflectivity deviation from the density deviation in which the interpolation processing is performed, determines a conversion curve of scanner reflectivity from the ratio of reflectivity deviation, and generates a newly second gamma correction table from the conversion curve of scanner reflectivity.

3. An image forming apparatus according to claim 1, wherein each step of the second printing portion, the calculating portion, and the second generating portion is automatically performed at a predetermined interval without user's instruction, and thereby the second gamma correction table is automatically updated.

4. An image forming apparatus for adhering a toner to a photosensitive member to form a toner image, and transferring the toner image on the photosensitive member onto a transfer member supported by a transfer member supporting member which is included in a transfer apparatus and is provided in contact with the photosensitive member, said image forming apparatus comprising:

a first storing portion which stores gradation pattern information in advance;

a first pattern forming portion which reads the gradation pattern information from the first storing portion, forms a toner image according to the read gradation pattern information on the photosensitive member, and transfers the toner image onto the transfer member by the transfer apparatus;

a first generating portion which reads an image according to the gradation pattern information on the transfer member formed by the pattern forming portion and generates a first gamma correction table on the basis of the read image information;

a second pattern forming portion which reads the gradation pattern information, corrects the gradation pattern information according to the first gamma correction table generated by the first generating portion, and forms a toner image corresponding to the corrected gradation pattern information;

a second storing portion which detects density of the toner image formed on the photosensitive member by the first pattern forming portion and storing the detected density as a reference value of density;

a third pattern forming portion which reads the gradation pattern information at an arbitrary timing, corrects the gradation pattern information by the first gamma correction table which the first generating portion generated, and forms a toner image according to the corrected gradation pattern information;

a calculating portion which detects density of the toner image formed on the photosensitive member by the third pattern forming portion, and compares the detected density with the reference value of density stored in the first storing portion to determine a density deviation;

a second generating portion which generates a second gamma correction table on the basis of the density deviation which the calculating portion has calculated; and an image forming portion which reads an original image using the scanner, corrects the read image information with the second gamma correction table formed by the second generating portion, forms a toner image based on the corrected image information on the photosensitive member, and transfers the toner image onto the transfer member by the transfer apparatus.

5. An image forming apparatus according to claim 4, wherein the second generating portion performs interpolation processing according to a plurality of gradation numbers for the density deviation determined by the calculating portion, determines a ratio of reflectivity deviation from the density deviation in which the interpolation processing is performed, determines a conversion curve of scanner reflectivity from the ratio of reflectivity deviation, and generates a newly second gamma correction table from the conversion curve of scanner reflectivity.

6. An image forming apparatus according to claim 4, wherein each step of the second printing portion, the calculating portion, and the second generating portion is automatically performed at a predetermined interval without user's instruction, and thereby the second gamma correction table is automatically updated.

7. An image forming method for adhering a toner to a photosensitive member to form a toner image, and transferring the toner image on the photosensitive member onto a transfer member supported by a transfer member supporting member which is included in a transfer apparatus and is provided in contact with the photosensitive member, said image forming method comprising the steps of:

storing gradation pattern information in advance;

reading the gradation pattern information from the first storing portion, forming a toner image according to the read gradation pattern information on the photosensitive member, and transferring the toner image onto the transfer member by the transfer apparatus;

reading an image according to the gradation pattern information on the transfer member formed by the pattern forming portion and generating a first gamma correction table on the basis of the read image information;

reading the gradation pattern information, correcting the gradation pattern information according to the first gamma correction table generated by the first generating portion, forming a toner image corresponding to the corrected gradation pattern information, and transferring the toner image onto the transfer member supporting member;

detecting density of the toner image transferred onto the transfer member supporting member by a sensor for the amount of adhered toner and storing the detected density as a reference value of density;

reading the gradation pattern information at an arbitrary timing, correcting the gradation pattern information by the first gamma correction table, forming a toner image according to the corrected gradation pattern information, and transferring the toner image onto the transfer member supporting member;

detecting density of the toner image transferred onto the transfer member supporting member by the sensor for the amount of adhered toner, and comparing the detected density with the reference value of density stored in the first storing portion to determine a density deviation;

generating a second gamma correction table on the basis of the density deviation calculated; and reading an original image using the scanner, correcting the read image information with the second gamma correction table formed by the second generating portion, forming a toner image based on the corrected image information on the photosensitive member, and transferring the toner image onto the transfer member by the transfer apparatus.

8. An image forming method for adhering a toner to a photosensitive member to form a toner image, and transferring the toner image on the photosensitive member onto a transfer member supported by a transfer member supporting member which is included in a transfer apparatus and is provided in contact with the photosensitive member, said image forming method comprising the steps of:

storing gradation pattern information in advance;

reading the gradation pattern information from the first storing portion, forming a toner image according to the read gradation pattern information on the photosensitive member, and transferring the toner image onto the transfer member by the transfer apparatus;

reading an image according to the gradation pattern information on the transfer member formed by the pattern forming portion and generating a first gamma correction table on the basis of the read image information;

reading the gradation pattern information, correcting the gradation pattern information according to the first gamma correction table generated by the first generating portion, and forming a toner image corresponding to the corrected gradation pattern information;

detecting density of the toner image formed on the photosensitive member by a sensor for the amount of adhered toner and storing the detected density as a reference value of density;

reading the gradation pattern information at an arbitrary timing, correcting the gradation pattern information by the first gamma correction table, and forming a toner image according to the corrected gradation pattern information;

detecting density of the toner image formed on the photosensitive member by the sensor for the amount of adhered toner, and comparing the detected density with the reference value of density stored in the first storing portion to determine a density deviation;

generating a second gamma correction table on the basis of the density deviation calculated; and reading an original image using the scanner, correcting the read image information with the second gamma correction table formed by the second generating portion, forming a toner image based on the corrected image information on the photosensitive member, and transferring the toner image onto the transfer member by the transfer apparatus.

9. An image forming method comprising the steps of:

reading gradation pattern information stored in a predetermined storage area and forming an image according to the gradation pattern information on an image recording medium;

reading a gradation pattern on the image recording medium by using a scanner, and generating a first gamma correction table on the basis of the read image information;

reading the gradation pattern information stored in the predetermined storage area, correcting the gradation pattern according to the first gamma correction table, and printing an image according to the corrected gradation pattern information on an image carrier;

detecting a density of the image printed on the image carrier in the first printing step, with a sensor for the amount of adhered toner, and storing the density of the image as a reference value of density in a storage area;

reading the gradation pattern information stored in the predetermined storage area at an arbitrary timing, correcting the gradation pattern information with the first gamma correction table generated in the first generating step, and printing an image according to the corrected gradation pattern information on the image carrier;

detecting the density of the image printed on the image carrier with the sensor for the amount of adhered toner, comparing the density of the image to the reference value of density stored in the storage step, and calculating density deviation;

generating a newly second gamma correction table on the basis of the density deviation; and reading image information on an original with the scanner, correcting the read image information with gamma correction table, and forming an image based on the corrected image information on the image recording medium.

* * * * *